US009451480B2

(12) United States Patent
Huang et al.

(10) Patent No.: US 9,451,480 B2
(45) Date of Patent: Sep. 20, 2016

(54) METHODS AND APPARATUS FOR POWER MANAGEMENT IN A WIRELESS COMMUNICATION SYSTEM

(71) Applicant: QUALCOMM Incorporated, San Diego, CA (US)

(72) Inventors: Yichao Huang, San Diego, CA (US); Chirag Sureshbhai Patel, San Diego, CA (US); Tamer Adel Kadous, San Diego, CA (US); Mehmet Yavuz, San Diego, CA (US); Lili Zhang, San Diego, CA (US); Rajat Prakash, San Diego, CA (US); Vinay Chande, San Diego, CA (US); Christophe Chevallier, San Diego, CA (US); Sumeeth Nagaraja, San Diego, CA (US); Farhad Meshkati, San Diego, CA (US); Suhas Mitra, San Diego, CA (US); Vansh Pal Singh Makh, San Francisco, CA (US); Yeliz Tokgoz, San Diego, CA (US); Cong Shen, San Diego, CA (US); Varun Khaitan, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/444,582

(22) Filed: Jul. 28, 2014

(65) Prior Publication Data
US 2014/0334424 A1   Nov. 13, 2014

Related U.S. Application Data

(63) Continuation-in-part of application No. 13/241,130, filed on Sep. 22, 2011.

(60) Provisional application No. 61/387,433, filed on Sep. 28, 2010, provisional application No. 61/897,078, filed on Oct. 29, 2013.

(51) Int. Cl.
*H04W 4/00* (2009.01)
*H04W 24/02* (2009.01)
(Continued)

(52) U.S. Cl.
CPC ........... *H04W 24/02* (2013.01); *H04B 17/391* (2015.01); *H04W 52/346* (2013.01);
(Continued)

(58) Field of Classification Search
None
See application file for complete search history.

(56) References Cited

U.S. PATENT DOCUMENTS 6,456,652 B1  9/2002  Kim et al.
6,977,912 B1  12/2005  Porter et al.
(Continued)

FOREIGN PATENT DOCUMENTS

CN   1237869 A   12/1999
CN   101496304 A   7/2009
(Continued)

OTHER PUBLICATIONS

International Search Report and Written Opinion—PCT/US2014/062966—ISA/EPO—Jan. 29, 2015.
(Continued)

*Primary Examiner* — Edan Orgad
*Assistant Examiner* — Rebecca Song
(74) *Attorney, Agent, or Firm* — Jia J. Wu

(57) ABSTRACT

Methods and apparatus for communication comprise aspects that include performing a power management procedure for configuring a subset of network entities to receive one or more of downlink signal measurements and/or one or more uplink signal measurements. The methods and apparatus further comprise aspects that include storing the one or more one or more of downlink signal measurements and/or one or more uplink signal measurements associated with the subset of network entities at a database for managing transmit power at the subset of network entities. Moreover, the methods and apparatus comprise aspects that include adjusting a transmit power value of at least one of the subset of network entities from a first transmit power value to a second transmit power value based at least in part on the one or more of downlink signal measurements and/or one or more uplink signal measurements.

28 Claims, 16 Drawing Sheets

(51) Int. Cl.
  *H04B 17/391*  (2015.01)
  *H04W 52/34*  (2009.01)
  *H04W 24/10*  (2009.01)
  *H04W 52/24*  (2009.01)
  *H04W 88/08*  (2009.01)
  *H04W 52/22*  (2009.01)
  *H04B 17/318*  (2015.01)
  *H04W 84/04*  (2009.01)

(52) U.S. Cl.
  CPC ........... *H04B 17/318* (2015.01); *H04W 24/10* (2013.01); *H04W 52/226* (2013.01); *H04W 52/244* (2013.01); *H04W 52/245* (2013.01); *H04W 84/045* (2013.01); *H04W 88/08* (2013.01)

(56) References Cited

U.S. PATENT DOCUMENTS

| | | | |
|---|---|---|---|
| 7,725,121 B2 | 5/2010 | Ishii et al. | |
| 7,853,215 B2 | 12/2010 | Kurek et al. | |
| 8,014,827 B2 | 9/2011 | Saito et al. | |
| 8,446,849 B2 | 5/2013 | Damnjanovic | |
| 8,521,211 B2 | 8/2013 | Kobayashi | |
| 8,812,047 B2 | 8/2014 | Carter et al. | |
| 2004/0203717 A1 | 10/2004 | Wingrowicz et al. | |
| 2005/0090263 A1 | 4/2005 | Ebata | |
| 2006/0083366 A1 | 4/2006 | Aoyama et al. | |
| 2007/0066329 A1* | 3/2007 | Laroia | H04B 7/2678 455/502 |
| 2008/0069028 A1 | 3/2008 | Richardson | |
| 2008/0188265 A1 | 8/2008 | Carter et al. | |
| 2009/0042593 A1 | 2/2009 | Yavuz et al. | |
| 2009/0098900 A1 | 4/2009 | Okabe | |
| 2009/0122739 A1* | 5/2009 | Yonezawa | H04W 16/20 370/312 |
| 2009/0135754 A1 | 5/2009 | Yavuz et al. | |
| 2009/0279519 A1 | 11/2009 | Brisebois et al. | |
| 2009/0291690 A1 | 11/2009 | Guvenc et al. | |
| 2010/0035647 A1 | 2/2010 | Gholmieh et al. | |
| 2010/0048212 A1 | 2/2010 | Yavuz et al. | |
| 2010/0144338 A1 | 6/2010 | Kim et al. | |
| 2010/0167771 A1 | 7/2010 | Raghothaman et al. | |
| 2010/0208700 A1 | 8/2010 | Shi et al. | |
| 2010/0234040 A1 | 9/2010 | Palanki et al. | |
| 2010/0273432 A1 | 10/2010 | Meshkati et al. | |
| 2010/0273435 A1* | 10/2010 | Sun | H04W 72/04 455/67.13 |
| 2010/0273481 A1 | 10/2010 | Meshkati et al. | |
| 2011/0018766 A1 | 1/2011 | Steer et al. | |
| 2011/0019638 A1 | 1/2011 | Hamel et al. | |
| 2011/0028180 A1 | 2/2011 | Sawai | |
| 2011/0312328 A1* | 12/2011 | Choi | H04L 5/0062 455/450 |
| 2012/0003970 A1 | 1/2012 | Iwamura | |
| 2012/0039265 A1 | 2/2012 | Patel et al. | |
| 2012/0046026 A1 | 2/2012 | Chande et al. | |
| 2012/0046063 A1 | 2/2012 | Chande et al. | |
| 2012/0142392 A1 | 6/2012 | Patel et al. | |
| 2012/0238279 A1 | 9/2012 | Yu et al. | |
| 2012/0252453 A1 | 10/2012 | Nagaraja et al. | |
| 2012/0252521 A1 | 10/2012 | Nagaraja et al. | |
| 2012/0282979 A1* | 11/2012 | Ashraf | H04W 16/08 455/561 |
| 2013/0044685 A1* | 2/2013 | Fong | H04J 11/0053 370/328 |
| 2013/0044697 A1 | 2/2013 | Yoo et al. | |
| 2013/0171999 A1 | 7/2013 | Katar et al. | |
| 2013/0259012 A1 | 10/2013 | Gormley et al. | |
| 2014/0135004 A1 | 5/2014 | Patel et al. | |
| 2015/0029884 A1* | 1/2015 | Seo | H04W 36/0088 370/252 |

FOREIGN PATENT DOCUMENTS

| | | |
|---|---|---|
| CN | 101606322 A | 12/2009 |
| EP | 2222098 A1 | 8/2010 |
| EP | 2352344 A1 | 8/2011 |
| GB | 2450123 | 12/2008 |
| GB | 2467796 A | 8/2010 |
| JP | H08322079 A | 12/1996 |
| JP | H1146382 A | 2/1999 |
| JP | 2000091988 A | 3/2000 |
| JP | 2004207839 A | 7/2004 |
| JP | 2005117357 A | 4/2005 |
| JP | 2007235831 A | 9/2007 |
| JP | 2009100107 A | 5/2009 |
| JP | 2010062783 A | 3/2010 |
| JP | 2010166164 A | 7/2010 |
| KR | 100753283 B1 | 8/2007 |
| KR | 20090123132 A | 12/2009 |
| KR | 20100085442 A | 7/2010 |
| WO | WO-2004112414 A1 | 12/2004 |
| WO | WO-2008157797 | 12/2008 |
| WO | 2009023596 A2 | 2/2009 |
| WO | WO-2009022952 A1 | 2/2009 |
| WO | WO-2009023592 A2 | 2/2009 |
| WO | WO-2009054759 A1 | 4/2009 |
| WO | WO-2009070608 A2 | 6/2009 |
| WO | 2009120689 A2 | 10/2009 |
| WO | 2009140312 A2 | 11/2009 |
| WO | WO-2010006909 A1 | 1/2010 |
| WO | 2010061530 A1 | 6/2010 |
| WO | WO-2010105232 | 9/2010 |
| WO | 2012040640 A1 | 3/2012 |
| WO | 2012044698 A1 | 4/2012 |
| WO | 2012177801 A1 | 12/2012 |
| WO | WO 2013/164024 * | 11/2013 |

OTHER PUBLICATIONS

Smaoui I., et al., "Heterogeneous Wireless Networks: Configuration and Vertical Handoff Management," Wireless Personal Communications, 2010, pp. 417-445, vol. 54 (3).

3GPP TS 25.104 V9.2.0 (Dec. 2009), 3rd Generation Partnership Project; Technical Specification Group Radio Access Network; Base Station (BS) radio transmission and reception (FDD) (Release 9), 86 pages.

"3rd Generation Partnership Project; Technical Specification Group Radio Access Network; Study on Minimization of drive-tests in Next Generation Networks; (Release 9)", 3GPP Standard; 3GPP TR 36.805, 3rd Generation Partnership Project (3GPP), Mobile Competence Centre ; 650, Route des Lucioles ; F-06921 Sophia-Antipolis Cedex ; France, No. V9.0.0, Dec. 21, 2009, pp. 1-24, XP050401520, [retrieved on Dec. 21, 2009].

Co-pending U.S. Appl. No. 14/159,294, filed Jan. 20, 2014.

ETSI TS 125 331 V8.1.0 (Jan. 2008), Universal Mobile Telecommunications System (UMTS); Radio Resource Control (RRC); Protocol specification (3GPP TS 25.331 version 8.1.0 Release 8), 1467 pages.

European Search Report—EP13191076—Search Authority—The Hague—Nov. 20, 2013.

Huawei: "Self-configuration considerations of Home NodeB", 3GPP TSG RAN WG3 Meeting #57, R3-071466, Aug. 2007.

International Search Report and Written Opinion—PCT/US2011/053111—ISA/EPO—Jan. 23, 2012.

Kulkarni P., et al., "Radio Resource Management Considerations for LTE Femto Cells", ACM SIGCOMM Computer Communication Review, vol. 40, No. 1, Jan. 2010, pp. 26-30.

"LTE; Evolved Universal Terrestrial Radio Access (U-UTRA); TDD Home eNode B (HeNB) Radio Frequency (RF) requirements analysis (3GPP TR 36.922 version 9.1.0 Release 9)", Technical Report, European Telecommunications Standards Institute (ETSI), 650, Route des Lucioles ; F-06921 Sophia-Antipolis ; France, vol. 3GPP RAN 4, No. V9.1.0, Jul. 1, 2010, XP014047116, chapter 7; p. 48-p. 72.

(56) References Cited

OTHER PUBLICATIONS

Partial International Search Report—PCT/US2011/053111—ISA/EPO—Nov. 30, 2011.
Patel C, et al., "Femtocell and Beacon Transmit Power Self-Calibration", Internet Citation, [Online] pp. 1-8, XP002637750, Retrieved from the Internet: URL:http://www.qualcomm.com/documents/files/femtocell-and-beacon-transmitpower-self-calibration.pdf> [retrieved on May 16, 2011].
QUALCOMM Incorporated, "Enterprise Multi-Femtocell Deployment Guidelines," Jun. 2011, 39 pages.

Taiwan Search Report—TW100134431—TIPO—Apr. 21, 2014.
Vodafone Group et al., "Methods and Tests to limit adjacent channel interference for Home NodeB", 3GPP Draft; R4-082020, 3rd Generation Partnership Project (3GPP), Mobile Competence Centre ; 650, Route des Lucioles ; F-06921 Sophia-Antipolis Cedex; France, vol. RAN WG4, No. Jeju; Aug. 26, 2008, XP050180517, [retrieved on Aug. 26, 2008].
Weitzen, J., et al., "Comparing Coverage Quality for Femtocell and Macrocell Broadband Data Services", IEEE Communications Magazine, vol. 48, No. 1, Jan. 2010, pp. 40-44, ISSN: 0163-6804.

\* cited by examiner

METHODS AND APPARATUS FOR POWER MANAGEMENT IN A WIRELESS COMMUNICATION SYSTEM

CLAIM OF PRIORITY

The present Application for Patent is a continuation-in-part of Non-Provisional patent application Ser. No. 13/241,130 entitled "ACCESS POINT TRANSMIT POWER CONTROL" filed Sep. 22, 2011, which claims priority to Provisional Application No. 61/387,433 entitled "METHOD AND APPARATUS FOR COVERAGE PLANNING AND DOWNLINK TRANSMIT POWER CALIBRATION FOR FEMTOCELL NETWORKS" filed Sep. 28, 2010, and to Provisional Application No. 61/386,278 entitled "TRANSMIT POWER CALIBRATION FOR FEMTOCELL NETWORKS" filed Sep. 24, 2010, and the present Application for Patent also claims priority to Provisional Application No. 61/897,078 entitled "METHODS AND APPARATUS FOR ENHANCED POWER MANAGEMENT IN WIRELESS COMMUNICATION SYSTEMS" FILED Oct. 29, 2013; and, each of the above-noted applications is assigned to the assignee hereof and hereby expressly incorporated by reference herein.

BACKGROUND

Aspects of the present disclosure relate generally to wireless communication, and more particularly, to methods and apparatus for power management.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

In some wireless communication networks, a user equipment (UE) selects and maintains a connection with a base station providing communication capabilities for the UE. Further, small cells may be deployed to improve wireless network communications when experiencing poor macro base station connections. In such wireless communication networks, inefficient utilization of available communication resources, particularly power resources, may lead to degradations in wireless communication. Even more, the foregoing inefficient resource utilization inhibits network devices from achieving higher wireless communication quality. In view of the foregoing, it may be understood that there may be significant problems and shortcomings associated with current power management technology. Thus, improvements in wireless network power management are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method of communication may include performing a power management procedure for configuring a subset of network entities to receive one or more downlink signal measurements. Further, in such aspects, the performing of the at least one power management procedure may include determining the subset of network entities from a set of network entities for transmitting at least one reference signal during an active session on a downlink communication channel, wherein the reference signal indicates a downlink power value of each respective network entity of the subset of network entities, and receiving the one or more downlink signal measurements. The method may further include storing the one or more downlink signal measurements associated with the subset of network entities at a database for managing transmit power at the subset of network entities. Additionally, the method may include adjusting a transmit power value of at least one of the subset of network entities from a first transmit power value to a second transmit power value based at least in part on the one or more downlink signal measurements.

In accordance with another aspect, a method of communication may include performing a power management procedure for configuring a subset of network entities to receive one or more uplink signal measurements. Further, in such aspects, the performing of the at least one power management procedure may include receiving a UE indication from a UE at the subset of network entities associated with the UE on an uplink communication channel and determining the one or more uplink signal measurements based at least in part on correlating the UE indication with a received signal strength indicator (RSSI) value. Further, the method may further include storing the one or more uplink signal measurements associated with the subset of network entities at a database for managing transmit power at the subset of network entities. Additionally, the method may include adjusting a transmit power value of at least one of the subset of network entities from a first transmit power value to a second transmit power value based at least in part on the one or more uplink signal measurements.

In accordance with a further aspect, an apparatus for communication may include a memory storing executable instructions and a processor in communication with the memory, wherein the processor is configured to execute the instructions to perform a power management procedure for configuring a subset of network entities to receive one or more downlink signal measurements. In such aspects, the performing of the at least one power management procedure may include determine the subset of network entities from a set of network entities for transmitting at least one reference signal during an active session on a downlink communication channel, wherein the reference signal indicates a downlink power value of each respective network entity of the subset of network entities and receive the one or more downlink signal measurements. The processor may further be configured to execute the instructions to store the one or more downlink signal measurements associated with the subset of network entities at a database for managing transmit power at the subset of network entities. Additionally, the processor may further be configured to execute the instructions to adjust a transmit power value of at least one of the subset of network entities from a first transmit power value to a second transmit power value based at least in part on the one or more downlink signal measurements.

In yet another aspect, an apparatus for communication may include a memory storing executable instructions and a processor in communication with the memory, wherein the processor is configured to execute the instructions to perform a power management procedure for configuring a subset of network entities to receive one or more uplink signal measurements. In such aspects, to perform the power management procedure, the processor may be configured to execute the instructions to receive a UE indication from a UE at the subset of network entities associated with the UE on an uplink communication channel and determine the one or more uplink signal measurements based at least in part on correlating the UE indication with a received signal strength indicator (RSSI) value. The processor may further be configured to execute the instructions to store the one or more uplink signal measurements associated with the subset of network entities at a database for managing transmit power at the subset of network entities. Additionally, the processor may be configured to execute the instructions to adjust a transmit power value of at least one of the subset of network entities from a first transmit power value to a second transmit power value based at least in part on the one or more uplink signal measurements.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
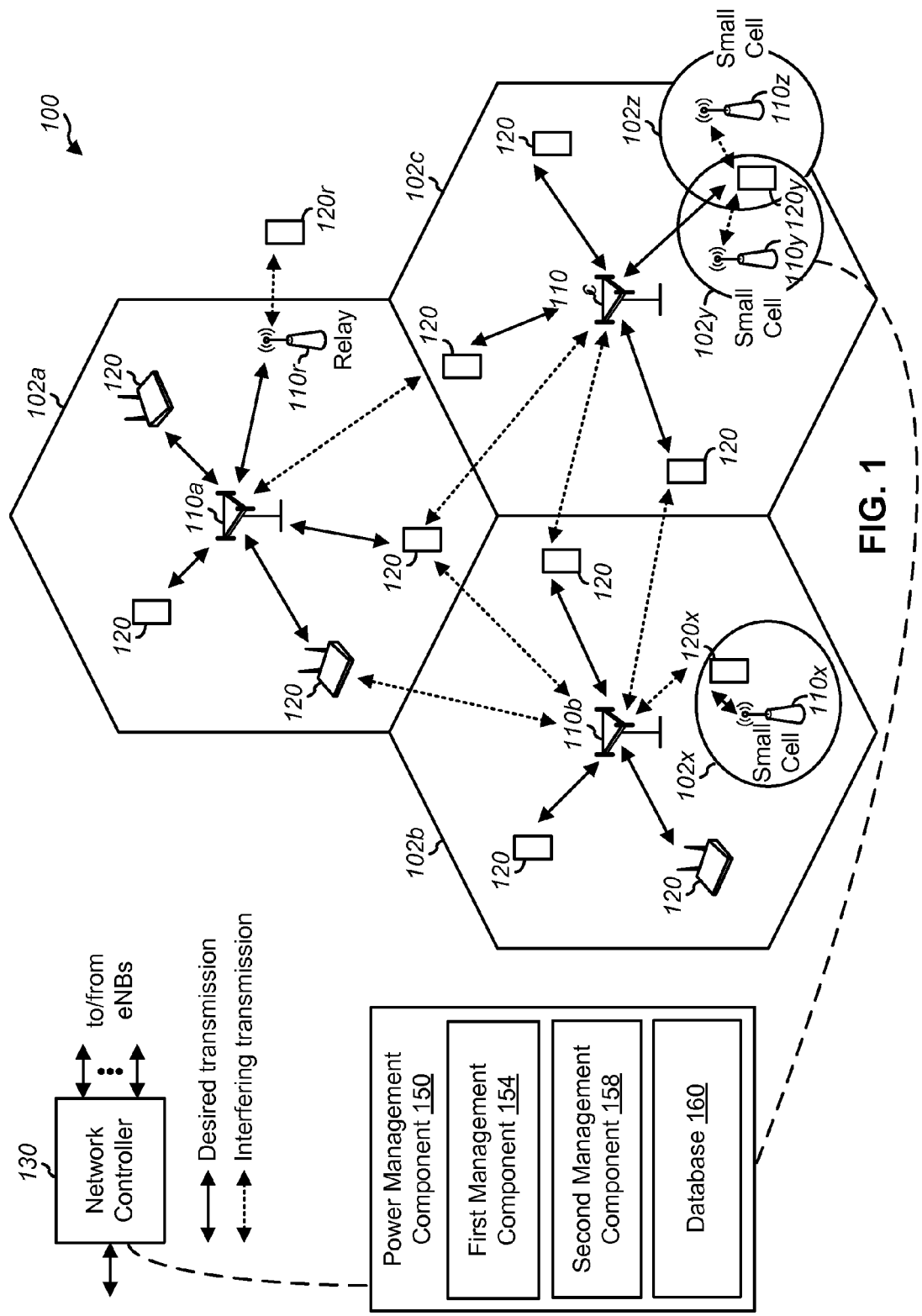
FIG. 1 is a block diagram conceptually illustrating an example of a telecommunications system in accordance with an aspect of the power management component.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

The present aspects generally relate to enhanced power management in wireless communication systems. Specifically, network entities such as small cells may engage in various configuration procedures in order to facilitate communication with one or more user equipments (UEs). Some configuration procedures may be autonomous, in that the small cell conducts various procedures without network operator initiation. However, in some communication systems comprising a plurality of small cells for dense communication environments, coordination of power management among a plurality of small cells may be deficient in that two or more neighboring small cells from the plurality of small cells may engage in power management that results in interference (e.g., inter/intra cell interference).

In other aspects, dense small cell communication environments may not adequately address the interference caused by deficient transmit power management among the plurality of small cells. Indeed, improved power information/statistic determinations, aggregation and access may permit one or more small cells to perform at least one coordinated power management procedure, as described herein. As such, one or more of the coordinated power management procedures described herein may permit the one or more small cells to consider or otherwise coordinate with one another to alleviate interference.

Accordingly, in some aspects, the present methods and apparatus may provide an efficient and effective solution, to provide enhanced power management by a network and/or at one or more small cells in a wireless communication system. In an aspect, the present apparatus and methods include a coordinated network entity solution configured to perform at least one coordinated power management procedure for configuring one or more small cells (e.g., network entities) to receive one or more power related measurements. Additionally, the present apparatus and methods may be configured to store one or more power related measurements associated with the one or more small cells at a database for managing transmit power at the one or more small cells based at least in part on performing the coordinated power management procedure. Accordingly, the one or more stored power related measurements may be used to adjust a transmit power value of the one or more small cells from a first transmit power value to a second transmit power value based at least in part on the one or more power related measurements, thereby enhancing the communication quality of the wireless communication system formed by the coordinated small cells.

As used herein, the term "small cell node" or "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell node or small cell may include, but is not limited to, an apparatus such as a base station (BS), an access point, a femto node or cell, a pico node or cell, a micro node or cell, a Node B, an evolved Node B (eNB), a home Node B (HNB) or cell, or a home evolved Node B (HeNB) or cell. Therefore, the terms "small cell node" or "small cell," as used herein, refer to a relatively low transmit power node and/or a relatively small coverage area cell as compared to a macro node or cell.

FIG. 1 is a block diagram conceptually illustrating an example of a telecommunications network system 100 in accordance with an aspect of the present disclosure. Telecommunications network system 100 may include one or more network entities 110, for example, one or more small cells (e.g., pico cells, femto cells, etc.) and/or evolved NodeBs (eNodeBs). That is, network entities 110 may be alternatively and/or interchangeably be referred to in some aspects as small cells 110. Additionally, telecommunications network system 100 may include network controller 130, which may be configured to provide coordination and control for the small cells 110.

In such aspects, each small cell 110 and network controller 130 may include power management component 150, which may be configured to coordinate power management between one or more network entities for adjusting a power level and thereby reducing interference. For instance, power management component 150, which may be included in or as part of network controller 130 and/or each small cell 110 illustrated in FIG. 1, may be configured to coordinate power management among the one or more network entities that may be referred to as small cells (e.g., 110x, 110y and 110z) for adjusting a power level and thereby reducing interference among these network entities.

In a non-limiting example, network controller 130 and/or small cell 110y may include power management component 150, which may coordinate power management with one or more small cells in the wireless communication system, such as, but not limited to, small cell 110z (illustrated as a femto cell but not limited thereto), which may also include power management component 150.

In an aspect, power management component 150 may be configured to provide a coordinated approach to managing transmit power at and/or for a plurality of small cells 110. Specifically, power management component 150 may be configured to perform at least one power management procedure for configuring one or more network entities to receive one or more power related measurements and thereby managing transmit power at one or more network entities (e.g., small cells 110x, 110y and 110z). In such aspects, the power management procedure may be performed during or as part of a training and/or learning mode/state by which the network 130 and/or a network entity (e.g., small cells 110x, 110y and 110z) may obtain power related measurements for adjustment of transmit power levels at one or more of the network entities. For example, the power management procedure may be performed by or according to one or both of first management component 154 and second management component 158.

In such aspects, first management component 154 may be configured to perform at least one power management procedure according to, or based on, signal-to-interference-and-noise-ratio (SINR) measurements. In other aspects, second management component 158 may be configured to perform at least one power management procedure according to, or based on, reference signal receive power (RSRP) measurements. Further, the power management procedure corresponding to one or both of first management component 154 and second management component 158 may coordinate amongst each other (e.g., among one or more network entities and the network) to produce or otherwise perform the power management procedure.

Additionally, power management component 150 may be configured to store one or more power related measurements at a database 160 for managing transmit power at the one or more network entities. In such aspects, the power related measurements may be any downlink signal measurement (e.g., related to SINR and/or RSRP) and/or an uplink signal measurement (e.g., RSSI). For example, one or more measurements such as or related to a SINR and/or RSRP may be determined based on the performance of the at least one power management procedure (e.g., by one or both of first management component 154 and second management component 158). In other aspects, measurements such as, but not limited to, one or more of reference signal received quality (RSRQ) values and one or more indications related to SINR or RSRQ may be received or determined based on the performance of the at least one power management procedure.

Such measurement information may be stored in a database 160, which may take the form of or otherwise be a centralized server (e.g., at network controller 130) configured to store measurement information from a plurality of network entities (e.g., small cells 110x, 110y and 110z) and provide access to the network entities for coordinating power management. In other aspects, database 160 may be included at or within power management component 150 at each small cell.

For example, power management component 150 may be configured to provide or otherwise aggregate the one or more power related measurements obtained or otherwise determined by first management component 154 and second management component 158 to or in database 160. In some aspects, the database 160 may comprise or be formed of a short term database and a long term database. In such aspects, first management component 154, which may employ a technician assisted method (e.g., technician measurement devices along a route provide measurements to at least a subset of network entities) may be used for initial deployment or measurement of network entities (e.g., small cells) forming a network in power determinations. The foregoing measurement information may be stored in the long term database as the measurement information assists in forming the basis or foundation for future power management procedures.

As such, second management component 158, which may employ a user assisted method (e.g., one or more UEs provide normal measurements during measurement periods) may be used to update and/or act as an alarm for notifying when to execute first management component 154 (e.g., execute the technician assisted method). Accordingly, the foregoing measurement information may be stored in the short term database as the measurement information assists in updating the measurement information stored in the long term database.

Figure 2:
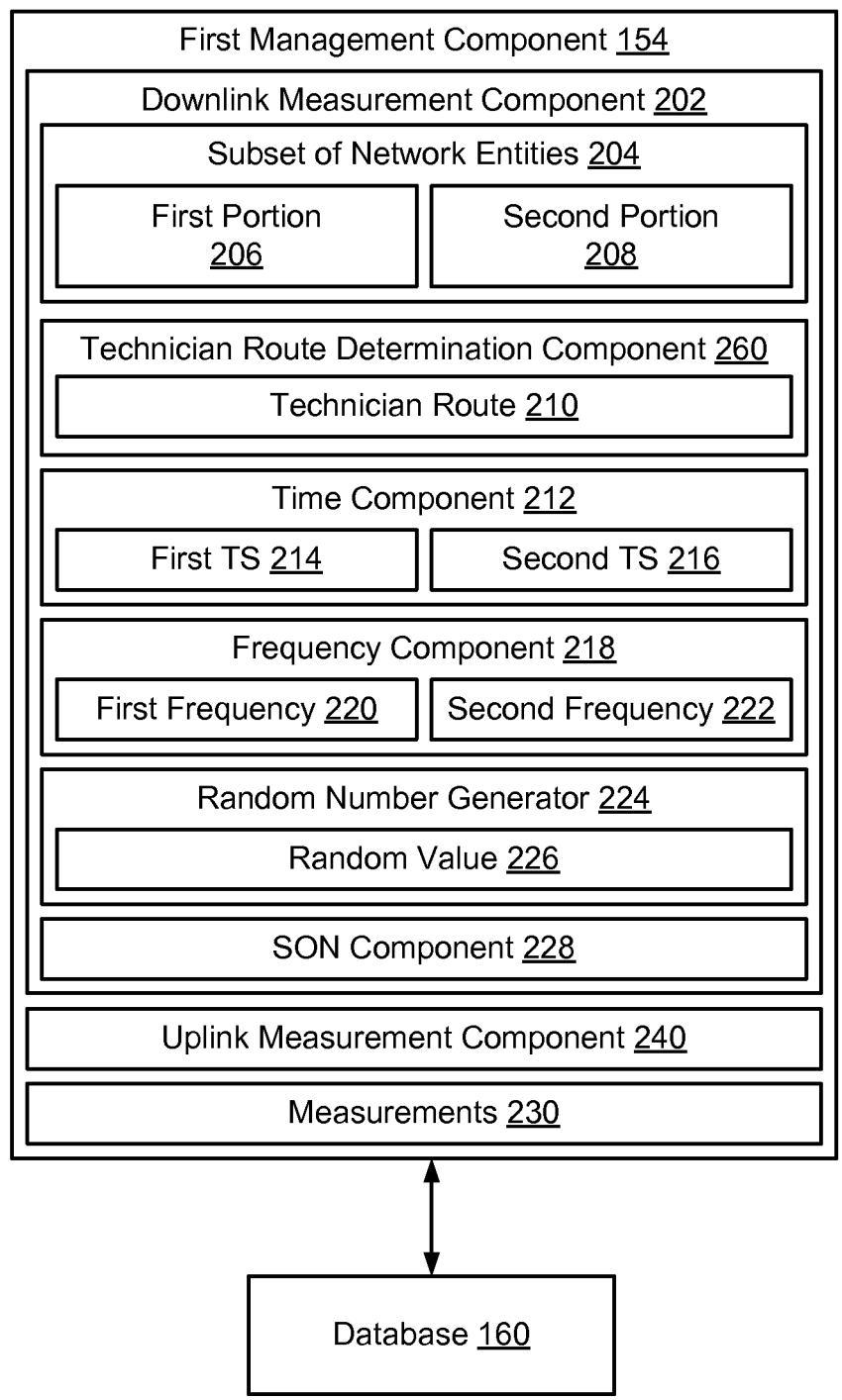
FIG. 2 is a block diagram conceptually illustrating an example of the first management component in accordance with an aspect described herein, e.g., according to the power management component of FIG. 1.

Referring to FIG. 2, in an aspect, first management component 154 may include various component and/or subcomponents, which may be configured to coordinate power management among one or more network entities (e.g., small cells 110x, 110y and/or 110z) based at least on SINR measurements. For example, first management component 154 may include downlink measurement component 202, which may be configured to obtain power related measurements (e.g., SINR values) from one or more technician measurement devices traveling along a technician route 210 formed or determined based on the small cells of interest. Specifically, downlink measurement component 202 may be configured to determine a subset of network entities 204 from the one or more network entities for transmitting at least one reference signal (e.g., cell reference signal and/or pilot signal) during an active session on a downlink communication channel.

In some aspects, the reference signal and/or the pilot signal may indicate or otherwise comprise a downlink power value of each of the subset of network entities. For example, network controller 130 and/or network entity 110y, in accordance with downlink measurement component 202, may be configured to determine that power related measurements are to be obtained from small cells 110z and 110x.

Moreover, downlink measurement component 202 may include technician route determination component 260, which may be configured to determine a technician route 210 based on, for instance, the subset of network entities 204. That is, technician route 210 may be determined by assessing each and every potential route for obtaining the one or more measurements 230 (e.g., power related measurements), and selecting the route where the lowest probability for interference with another small cell may be experienced by a technician. In some aspects, the one or more measurements 230 may receive, from one or more measurement devices associated with the technician route 210, the one or more measurements 230 (e.g., power related measurements) from the subset of network entities 204. Further, in other aspects, the one or more measurements 230 may include one or more downlink signal measurements and/or one or more uplink signal measurements.

Technician route 210 may be a specific route or path comprised of or including a sequence of locations or coverage areas corresponding to one or more network entities of interest from the subset of network entities 204. For example, a path or route forming the technician route 210 may determined based at least in part on a first portion 206 selected or determined from the subset of network entities 204 and a second portion 208 from the subset of network entities 204. In some aspects, the first portion 206 may be alternatively or interchangeably referred to as a first subset of the subset of network entities 204. In addition, in other aspects, the second portion 208 may be alternatively or interchangeably referred to as a second subset of the subset of network entities 204.

Further, the technician route may be a route or path defined by the technician to obtain one or more power related measurements and may be obtained less frequently (e.g., at an initial stage of a network setup and/or a network change triggers another power management procedure to obtain the power related measurements). Further, in some non-limiting aspects, technician route 210 may alternatively be referred to as a training walk. Additionally, the first portion 206 and the second portion 208 may include one or more network entities from the subset of network entities 204.

Additionally, downlink measurement component 202 may be configured to receive the one or more measurements 230 (e.g., SINR values), from the one or more measurement devices associated with the technician route 210, a measurement value (e.g., SINR value) from a first portion 206 of the subset of network entities 204 experiencing higher traffic than a second portion 208 of the subset of network entities 204. In some aspects, for example, the one or more measurements devices forming the technician route 210 may obtain a first measurement value from a first subset 206 of the subset of network entities 204 experiencing higher traffic (e.g., as determined by historical measurements stored in database 160, FIG. 1) than a second measurement value of a second subset 208 of the subset of network entities 204. In other aspects, the first measurement value may be higher than the second measurement value. Moreover, the one or more measurements 230 from the measurement devices forming the technician route 210 may include a number of detected network entities.

Further, in aspects including two or more network entities including power management component 150, first management component 154 may coordinate the measurement acquisition by the measurement devices forming or otherwise associated with the technician route 210 so as to avoid or otherwise alleviate interference, thereby permitting the acquisition of accurate and precise measurements 230 (e.g., power related measurements). For instance, first network entity 110y and second network entity 110z may both include power management component 150. As such, first management component 154 of first network entity 110y may coordinate power management with second network entity 110z, which may optionally include power management component 150.

For example, downlink measurement component 202 of first management component 154 may be configured to determine the subset of network entities 204 from the one or more network entities (e.g., small cells 110 of FIG. 1) higher than a second power value of the subset of network entities 204 during an inactive session. In particular, downlink measurement component 202 may be configured to determine a time slot at which to transmit a reference signal and/or pilot signal on a downlink communication channel for each respective network entity so as to avoid interference with neighboring network entities. In such example, network entity 110y may determine, in a random manner according to a random value 226 assigned to each time slot in a set of available time slots for transmitting the reference power signal.

In further aspects, downlink measurement component 202 may be configured to schedule the subset of network entities 204 during the active session based on one or both of a random assignment procedure and a self-organizing procedure. For example, downlink measurement component 202 may be configured to perform or conduct the random assignment procedure via random number generator 224. In particular, downlink measurement component 202 may be configured to determine a random value 226 via random number generator 224 for assigning or scheduling a respective network entity (e.g., small cell 110) to one or more time slots and/or frequencies for performing the power related measurements. Additionally, downlink measurement component 202 may include SON component 228 to perform or conduct the self-organizing network (SON) procedure so as to permit the network entities (e.g., small cells 110) to coordinate amongst each other in scheduling measurement periods in a non-interfering manner.

Specifically, for instance, downlink measurement component 202 may include time component 212, which may determine a first subset of 206 of network entities from the one or more network entities for transmission of the at least one reference signal (e.g., CRS) at a first time slot 214 (first TS 214) and a second subset 208 of network entities for transmission of at least one reference signal (e.g., CRS) at a second time slot 216 (second TS 216) so as to at least avoid or alleviate interference and populate the coordination database with more accurate power management information (e.g., SINR measurement). In some aspects, downlink measurement component 202 may be configured to determine or otherwise schedule the subset of network entities 204 (e.g., first portion 206 and second portion 208) based on, for instance, one or both of the random assignment procedure and the self-organizing procedure.

It should be understood that coordination of the one or more measurements (e.g., SINR measurement) may be made in the time domain since the reference signal transmitted during the active time duration occurs at a power level higher than a power level transmitted during an inactive time duration. Accordingly, for network entities in close proximity (e.g., first network entity 110y and second network entity 110z), concurrent transmission of the reference signal on the same or overlapping time slot may result in interference.

Additionally, first management component 154 may include frequency component 218, which may be configured to acquire one or more measurements (e.g., SINR measurements) according to a frequency approach. For instance, frequency component 218 may be configured to determine a first portion 206 of network entities from the one or more network entities (e.g., subset of network entities 204) for transmission of the at least one reference signal at a first frequency 220 and a second portion 208 of network entities from the one or more network entities (e.g., subset of network entities 204) for transmission of the at least one reference signal at a second frequency 222. In such aspects, the first frequency 220 and the second frequency 222 may be a respective value indicative of a frequency for communication.

In some aspects, frequency component 218 may be configured to determine the first subset 206 of network entities and the second subset 208 of network entities based on, for example, one or both of the random assignment procedure according to random number generator 224 and self-organizing procedure according to SON component 228. The first frequency 220 may also be referred to as a first frequency value 220, while the second frequency 222 may also be referred to as a second frequency value 222.

Further, for example, frequency component 218 may be configured to determine or otherwise assign a first subset 206 of network entities (e.g., first network entity 110y) from the one or more network entities a first frequency value 220 from a set or range of frequencies and determine or otherwise assign a second subset 208 of network entities (e.g., first network entity 110y) from the one or more network entities a second frequency value 222 from the set or range of frequencies.

As such, in both the time domain approach (e.g., assigning network entities to time slots) and the frequency domain approach (e.g., assigning network entities to frequency values), first management component 154 may determine a time slot from a set or range of time slots based at least on a unique random value assigned to each time slot in the set or range of frequencies, and a frequency value from a set or range of frequency values based at least on a unique random value assigned to each frequency value in the set or range of frequencies.

In other non-limiting aspects, database 160 (FIG. 1) and/or a user equipment (UE) such as UE 120 may determine the subset of network entities from the one or more network entities for transmitting at least one reference signal during the active time duration on the downlink communication channel. In additional non-limiting aspects, the procedures described herein with respect to first management component 154 and second management component 158 may be combined or otherwise performed in concurrently. In other words, in order to adjust power level and/or reduce interference and/or to populate the coordination database, each network entity including power management component 150 may execute one or both first management component 154 and second management component 158.

In further aspects, first management component 154 may include uplink measurement component 240, which may be configured to detect or otherwise determine at least one UE indication at the one or more network entities (e.g., small cells 110) on at least one uplink communication channel. For example, first management component 154 may determine path loss information for SINR determinations by determining at least one UE signal at the one or more network entities (e.g., first network entity 110y) on at least one uplink communication channel. Accordingly, first management component 154 may determine the one or more measurements 230 (e.g., SINR measurements) based at least one the detecting of the at least one UE signal.

In some aspects, the at least one UE signal may include, but is not limited to a transmit power level value, a received signal strength indicator (RSSI) value, a sounding reference signal (SRS) value and a demodulation reference signal (DM-RS) value. For instance, uplink measurement component 240 may be configured to receive a UE indication from a UE at the one or more network entities associated with the UE on an uplink communication channel. In such aspects, the UE indication may include one or more of a power level value, a SRS value and a DM-RS value. Additionally, uplink measurement component 240 may be configured to determine the one or more measurements 230 based at least in part on correlating the UE indication with a RSSI value.

In some aspects, the UE (e.g., UE 120y, FIG. 1) may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a wireless transmit/receive unit, or some other suitable terminology.

In some aspects, the measurement period may be any period specified in any unit of time or in accordance with the communication characteristics (e.g., subframe, time slot, frequency band) of the respective technology (e.g., LTE) used to communicate, for example, between network entity 110y and UE 120y.

In a use case not to be construed as limiting, first management component 154 may include or otherwise be referred to as a technician-assisted network supervised architecture. In such architecture, there may be one (or multiple) technician(s) with a measurement device (e.g., pilot scanner, UE, etc.) to obtain measured signal strength for the small cells of interest by moving (or standing) across (at) a series of locations forming the so called technician route 210. During the technician route 210, the network (e.g., network controller 130, FIG. 1) may supervise the small cells of interest (e.g., small cells 110) to have equal (or pre-determined) transmit power in order to let the device measure the signal strength. After the technician route is completed, the obtained measurements 230 may be used to form database 160 (FIG. 1) for power management. The measurements 230 may be used to aggregate a database including, for example, the signal strength (e.g., RSSI) of one or more small cells that may be measured by the measurement device.

Hence, in one aspect of the non-limiting use case, the technician-assisted network supervised architecture may orthogonalize or otherwise configure the small cells of interest in the time domain. For example, each small cell of interest may transmit higher power on the CRS symbols during the ON period (e.g., active session) and may remain lower power on the CRS symbols during the OFF period (e.g., inactive session). At a given time slot for the ON period, a subset of the small cells may transmit higher power instead of the total number of small cells of interest, thereby reducing the potential for interference.

Therefore, the number of small cells interfering with each other on the CRS symbols may be reduced and there may be an increased chance of detecting more small cells to build the database for SINR based power management. The pattern of designing ON-OFF period for the small cells of interest may be randomly designed (e.g., according to random number generator 224) (e.g., if there are 20 small cells of interest, each small cell would randomly pick 1 out of the 20 time slots as the ON period, or randomly pick 1 out of the 5 time slots as the ON period to have 4 small cell interfering with each other on average) and/or designed in a self-organizing manner (e.g., according to SON component 228) (e.g., the physical close placed small cells would choose different time slot as the ON period).

In further aspects, the orthogonal or configured sets may be determined using a network assisted approach and/or a technician assisted approach. In the network assisted method, the PCI (physical cell identity) may be determined by other self-organizing techniques. Then the required orthogonal sets may be functions of the PCI sets. In the technician assisted method, the statistics of the number of detected small cells may be known after the technician route. Then the required orthogonal sets may be functions of the statistics of the detected small cells in the technician route.

In additional aspects of measurements on the uplink, one or more UEs may be used as measuring devices. For example, at a given location on the technician route, the one or more UEs may be associated with one of the small cells of interest. Based on uplink power control, the one or more UEs may transmit a certain power to the associated small cell. While the signal from the one or more UEs may be detected at the associated small cell in uplink, other small cells in uplink may also detect the signal from the one or more UEs.

Subsequently, the following methods, either alone or in combination with one another, may be used to exact the path loss information to build the database for the SINR based power management. One method can be based on RSSI: the received signal in the uplink for the associated small cell may be the wideband RSSI. After the technician route, the information from both the one or more UEs (i.e., uplink transmit power at any time instant) and the received RSSI at the associated small cells may be correlated to exact the path loss information. Another method may be based on SRS or DM-RS: may rely on SRS or DM-RS signaling in the uplink to carry the specific information from the one or more UEs to the small cell. In order to decode the information on SRS or DM-RS, the associated small cells may transmit such information to the other small cells using the X2 interface.

Additionally, in aspects of measurements on the downlink, a frequency approach may be used to orthogonalize or otherwise configure the interfering small cells in frequency domain. The one or more UEs may be used as the measurement device in the technician route. The small cells of interest may be partitioned into subsets (e.g., out of 20 small cells, they may be partitioned into 4 subsets so that out of 20 MHz bandwidth, 5 small cells could transmit in each of the 5 MHz bandwidth). The small cell portioning in the frequency domain may be either randomly chosen or be designed in a self-organizing manner.

The one or more UEs conduct measurements in each of the inter-frequency bandwidth. Then the detected information of small cells in each of the inter-frequency band may be combined together to form the database for the SINR based power management. In other aspects, a joint frequency and time domain orthogonalization approach may be used to conduct the measurements. For example, in each inter-frequency band, the small cells may be chosen to transmit higher power during the ON-period and transmit lower power during the OFF-period. Further, each small cell may choose to transmit on any aggregated inter-frequency bandwidth (e.g., a small cell may transmit higher power during the ON-period on two 5 MHz inter-frequency bandwidths of the total 20 bandwidth). It should be understood that any one or more of the approaches/methods may be used to aggregate and/or form a database for the technician assisted approach (e.g., SINR based power management).

Figure 3:
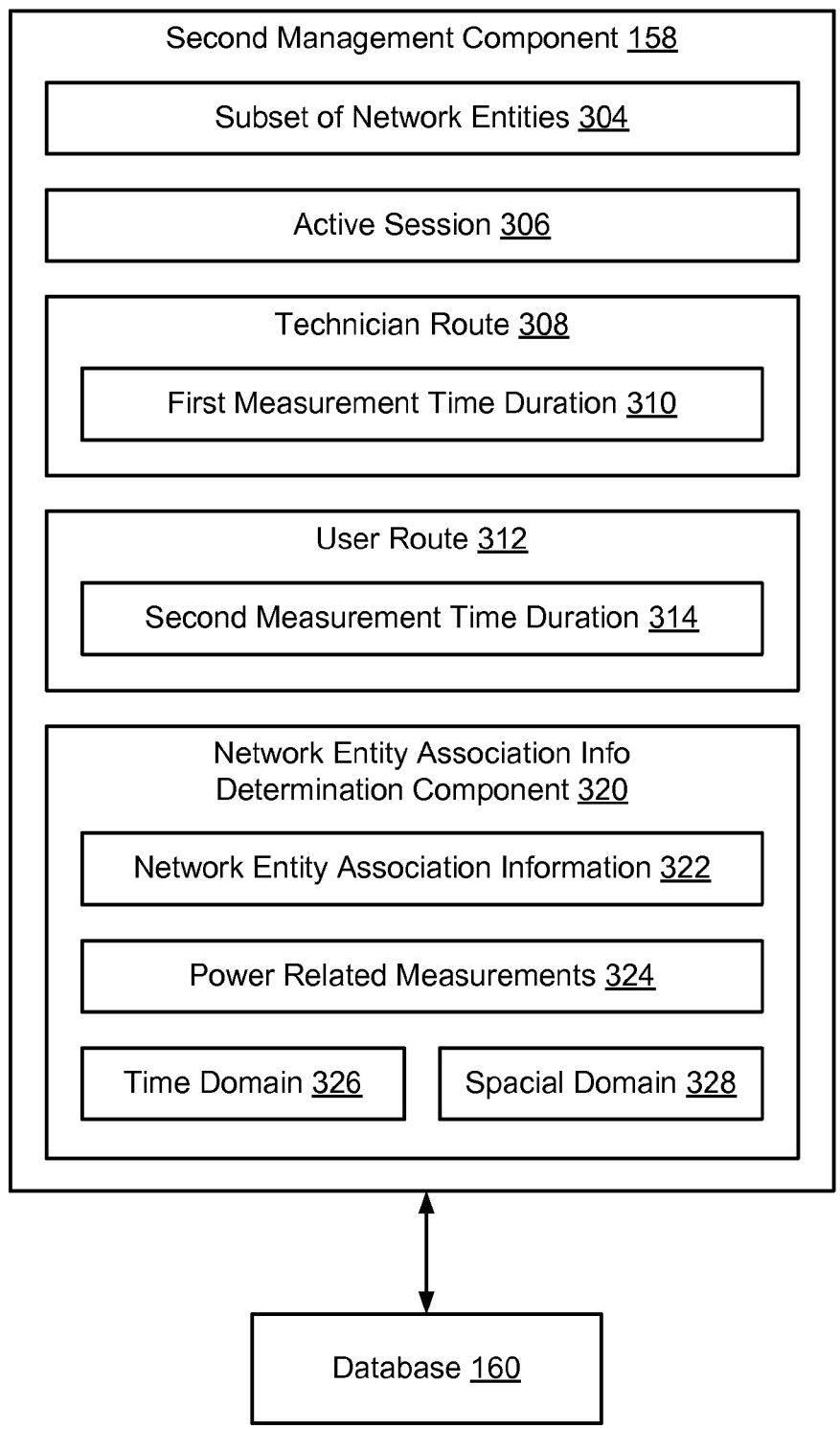
FIG. 3 is a block diagram conceptually illustrating an example of the second management component in accordance with an aspect described herein, e.g., according to the power management component of FIG. 1.

Referring to FIG. 3, in an alternative or additional aspect, second management component 158 may include various components and/or subcomponent, which may be configured to coordinate power management among one or more network entities (e.g., small cells 110x, 110y and/or 110z) based at least on RSRP measurements. Specifically, second management component 158 may be configured to receive the one or more measurements 324 (e.g., power related measurements) from a subset of the one or more network entities 304 during an active duration. In some aspects, the subset of the one or more network entities 304 may include network entities detected by one or more UEs forming one or both a technician route 308 and a user route 312. In other aspects, the one or more measurements 324 may include one or more downlink signal measurements and/or uplink signal measurements. For example, small cells 110x, 110y and 110z may include power management component 150.

In such aspects, the user route 312 may be a route or path comprised of or including a sequence of locations or coverage areas corresponding to one or more network entities of interest from the subset of network entities 204. Additionally, the user route 312 may be a route or path collectively traveled by many UEs in the network environment. For example, each UE may have its route or path as it travels independently in the network environment and the collected data can be fed back to the network (e.g., via small cells 110x, 110y and 110z).

Further, second management component 158 may include network entity association information determination component 320, which may be configured to determine network entity association information 322 based on, for example, one or more measurements 324 (e.g., power related measurements). In some aspects, the network entity association information 322 may include statistical information relating to the one or more power related measurements. For example, the statistical information may include, but is not limited to, information relating to a power related relationship between two or more network entities measured along one or both of the technician route 308 and/or the user route 312 based at least in part on, for instance, an average received power over the resource elements that carry cell-specific reference signals within a certain frequency bandwidth.

In additional aspects, second management component 158 may receive the one or more measurements 324 (e.g., power related measurements) from the one or more UEs and/or measurement devices forming a technician route 308 during a first measurement time duration 310 or the one or more UEs forming a user route 312 during a second measurement time duration 314. In some aspects, the second measurement time duration 314 may be longer in duration than the first measurement time duration 310. In further aspects, the network entity association information 322 comprise one or both of statistical information detected in a time domain 326 for the subset of the one or more network entities 304 and statistical information detected in a spatial domain 328 for the subset of the one or more network entities 304.

As such, in some non-limiting aspects, first network entity 110y may transmit, to second network entity 110z and third network entity 110x, one or more power related measurements (e.g., RSRP information) for determining network entity association information. In other words, second and third network entity 110z and 110x may indirectly through a cell association approach to reduce interference. In some aspects, the time duration may include at least one a first measurement time duration and a second measurement time duration longer than the first time duration.

In another use case not to be construed as limiting, second management component 158 may include or otherwise be referred to as an RSRP based architecture. For example, the architecture may utilize RSRP information reported from one or more users (UEs) to perform power management. The benefit of using such method may be that it does not assign weight to the non-detected small cells and only makes use of the information for the detected small cells. The unique feature which makes it robust to the detection capability may be that the power management may be not directly related to the throughput or user experience. Rather, the power management may operate on the cell association information, which relates indirectly to the throughput or user experience.

The procedure for conducting the RSRP based power management may be as follows: Within a certain time period (e.g., short period for the technician assisted architecture and longer period, i.e., hours or days, for the user assisted architecture), the RSRP information for the detected small cells may be reported to the associated small cells of interest to form the database. The cell association statistics, whether in time domain (e.g., serving cell statistics for each of the small cells of interest assembled in time) and/or in space domain (e.g., with GPS information, the serving cell statistics of each of the small cells of interest assembled in physical locations), may be used to conduct power management according to power management component 150. The method to management power may operate on the cell association statistics. For example, if the aim may be to equalize the small cells of interest, then the method may minimize the variance of the cell association statistics for the small cells of interest.

Additional aspects may include a combination of SINR based method with RSRP based method. Since the SINR based method may be directly related to the user experience but relies on technician assistance, the SINR based method may be conducted in the initial phase of deployment and the serving cell statistics can be generated based on the SINR based method. Then in order to update the power management, the RSRP method may be used and the updated serving cell statistics may be tuned to match the statistics from the SINR based method. Also, the RSRP based method may be used as alarm setting or triggering method to call for the need of technician support for the small cells of interest, for example, according to the aspects of the first management component 154.

The one or more network entities may include, or communicate according to at least one technology such as, but not limited to, long term evolution (LTE), universal mobile telecommunications system (UMTS), code division multiple access (CDMA) 2000, wireless local area network (WLAN) (e.g., WiFi).

Moreover, in some non-limiting aspects, the telecommunications network system 100 may be an LTE network. In such aspects, the telecommunications network system 100 may include a number of small cells 110 in the form of evolved NodeBs (eNodeBs), each of which may include power management component 150, and user equipment (UEs) 120 and other network entities. An eNodeB 110 may be a station that communicates with the UEs 120 and may also be referred to as a base station, small cell, an access point, etc. A NodeB is another example of a station that communicates with the UEs 120.

Each eNodeB 110 may provide communication coverage for a particular geographic area. In 3GPP, the term "cell" can refer to a coverage area of an eNodeB 110 and/or an eNodeB subsystem serving the coverage area, depending on the context in which the term is used.

An eNodeB 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 may be subscribed to a Closed Subscriber Group (CSG), UEs 120 for users in the home, etc.).

An eNodeB 110 for a macro cell may be referred to as a macro eNodeB. An eNodeB 110 for a pico cell may be referred to as a pico eNodeB. An eNodeB 110 for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB 110 may provide communication coverage for one or more (e.g., three) cells. It should be understood that each of the eNodeBs may include power management component 150.

The telecommunications network system 100 may include one or more relay stations 110r and 120r, that may also be referred to as a relay eNodeB, a relay, a small cell relay etc. The relay station 110r may be a station that receives a transmission of data and/or other information from an upstream station (e.g., an eNodeB 110 or a UE 120) and sends the received transmission of the data and/or other information to a downstream station (e.g., a UE 120 or an eNodeB 110). The relay station 120r may be a UE that relays transmissions for other UEs (not shown). In the example shown in FIG. 1, the relay station 110r may communicate with the eNodeB 110a and the UE 120r in order to facilitate communication between the eNodeB 110a and the UE 120r.

The telecommunications network system 100 may be a heterogeneous network that includes eNodeBs 110 of different types, e.g., macro eNodeBs 110a-c, pico eNodeBs 110x, femto eNodeBs 110y-z, relays 110r, etc. These different types of eNodeBs 110 may have different transmit power levels, different coverage areas, and different impact on interference in the telecommunications network system 100. For example, macro eNodeBs 110a-c may have a high transmit power level (e.g., 20 Watts) whereas pico eNodeBs 110x, femto eNodeBs 110y-z and relays 110r may have a lower transmit power level (e.g., 1 Watt).

The telecommunications network system 100 may support synchronous or asynchronous operation. For synchronous operation, the eNodeBs 110 may have similar frame timing, and transmissions from different eNodeBs 110 and may be approximately aligned in time. For asynchronous operation, the eNodeBs 110 may have different frame timing, and transmissions from different eNodeBs 110 and may not be aligned in time. The techniques described herein may be used for both synchronous and asynchronous operation.

A network controller 130 may be coupled to a set of eNodeBs 110 and provide coordination and control for these eNodeBs 110. The network controller 130 may communicate with the eNodeBs 110 via a backhaul (not shown). The eNodeBs 110 may also communicate with one another, e.g., directly or indirectly via wireless or wire line backhaul (e.g., X2 interface) (not shown).

The UEs 120 (e.g., 120x, 120y, etc.) may be dispersed throughout the telecommunications network system 100, and each UE 120 may be stationary or mobile. For example, the UE 120 may be referred to as a terminal, a mobile station, a subscriber unit, a station, etc. In another example, the UE 120 may be a cellular phone, a personal digital assistant (PDA), a wireless modem, a wireless communication device, a handheld device, a laptop computer, a cordless phone, a wireless local loop (WLL) station, a tablet, a netbook, a smart book, etc. The UE 120 may be able to communicate with macro eNodeBs 110a-c, pico eNodeBs 110x, femto eNodeBs 110y-z, relays 110r, etc. For example, in FIG. 1, a solid line with double arrows may indicate desired transmissions between a UE 120 and a serving eNodeB 110, which is an eNodeB 110 designated to serve the UE 120 on the downlink and/or uplink. A dashed line with double arrows may indicate interfering transmissions between a UE 120 and an eNodeB 110.

LTE may utilize orthogonal frequency division multiplexing (OFDM) on the downlink and single-carrier frequency division multiplexing (SC-FDM) on the uplink. OFDM and SC-FDM may partition the system bandwidth into multiple (K) orthogonal subcarriers, which are also commonly referred to as tones, bins, etc. Each subcarrier may be modulated with data. In general, modulation symbols may be sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal Fast Fourier Transform (FFT) size may be equal to 128, 256, 512, 1024 or 2048 for system bandwidth of 1.25, 2.5, 5, 10 or 20 megahertz (MHz), respectively. The system bandwidth may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 4:
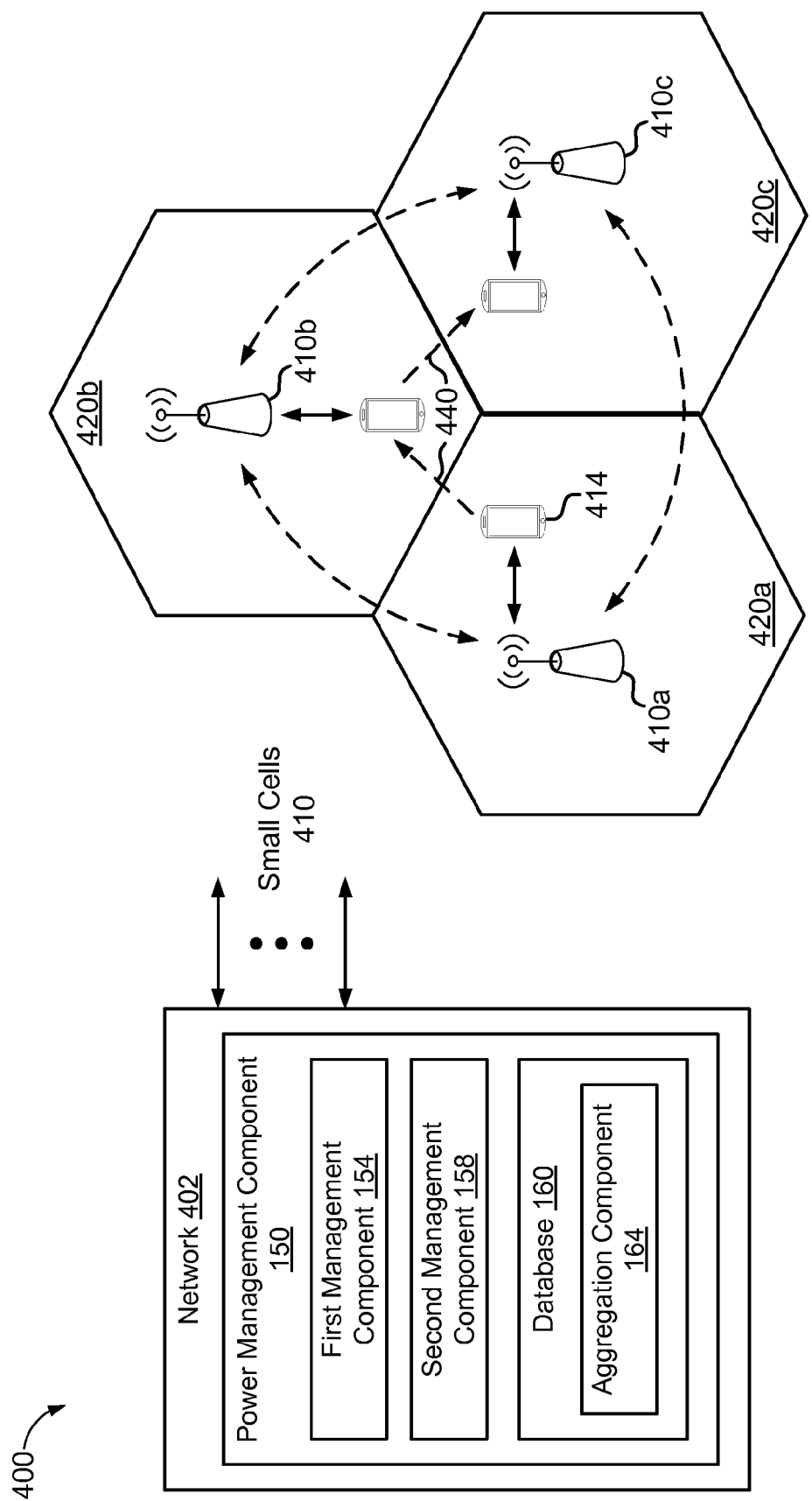
FIG. 4 is a conceptual diagram of an example communication system in accordance with an aspect described herein, e.g., according to the power management component of FIG. 1.

Referring to FIG. 4, a conceptual diagram illustrates an example communication system 400 for managing transmit power at one or more small cells 410 in accordance with power management component 150. For example, communication system 400 may include small cells 410a, 410b and 410c, each of which include a corresponding communication coverage area 420a, 420b and 420c, respectively. Further, network 402 may be configured to communicate with each of the small cells 410. Network 402 may include power management component 150, which may be configured to obtain and aggregate power related measurements from the one or more small cells 410 for transmit power and/or interference management. In such aspects, power management component 150 may include or comprise the aspects described herein with respect to FIGS. 1-3. Additionally, database 160 may include an aggregation component 164, which may be configured to aggregate power related measurements obtained or received by one or both of first management component 154 and second management component 158.

For instance, power management component 150 may be configured to perform a power management procedure for configuring one or more small cells 410 to receive one or more power related measurements. In such example, small cells 410 may obtain measurements from measurement device 414. Initially, power management component 150 may determine a subset of the small cells for obtaining or receiving the power related measurements. The subset of small cells may be obtained from a larger set of small cells associated with communication system 400. For example, power management component 150 may determine that small cell 410a, 410b and 410c require measurement in such order.

Accordingly, power management component 150 may determine or otherwise formulate technician route 440 based on the determined small cells of interest (e.g., small cells 410). In some aspects, power management component 150 may execute one or both of first management component 154 and second management component 158 to determine a subset of small cells for obtaining measurements and a corresponding technician route based on one or more network condition factors, such as, but not limited to, areas of high network traffic and/or congestion, areas of low measurement acquisition, areas experiencing low throughput, and area of high power consumption.

Upon determining or forming the technician route, network 402, via power management component 150, may provide the technician route 440 to measurement device 414. In alternate aspects, one or more of small cells 410 and/or measurement device 414 may determine the technician route 440 based on receiving the small cells of interest (e.g., the subset of small cells selected for power management). Measurement device 414 may obtain and provide measurements to the small cells 410 as it travels along the technician route 440. It should be understood that measurement device 414 may be carried or operated by a user or technician. For instance, measurement device 414 may initially begin in coverage area 420a corresponding to small cell 410a.

Upon obtaining and communicating power related measurements (e.g., RSSI and/or RSRP of small cells 410a) to small cells 410a, measurement device may proceed to coverage area 420b corresponding to small cell 410b, where measurement device 414 again obtains and communicates power related measurements corresponding to at least small cell 410b (e.g., RSSI and/or RSRP of small cell 410b). Further, for instance, measurement device 414 may proceed from coverage area 420b to coverage area 420c, where additional measurement may be obtained and communicated relating to the RSSI and/or RSRP of 410c.

As such, as measurement device 414 travels along the technician route 440 from one small cell coverage area to another, each corresponding small cell 410 may request the measurement device 414 to measure and report the signal quality of the small cells, and in some aspects, one or more macro cells. This may provide one or more small cells (e.g., small cell 410a) an indication of the measurement information corresponding to an RSSI value and/or RSRP value, as well as the observed interference. Using at least the measurement information, each small cell may adjust its respective transmit power in an attempt to achieve optimal transmit power levels. The power related information may be transmitted to network 402 for storage in database 160 via aggregation component 164.

Specifically, aggregation component 164 may continuously aggregate measurements received from small cells 410 in database 160 for use in determining optimal transmit power for one or more small cells and/or determining or otherwise selecting a subset of small cells for obtaining power related measurements and formulating the technician route based thereon. In particular, for example, aggregation component 164 may initially aggregate power related information received from first management component 154 (e.g., RSSI measurements) for determining transmit power of one or more small cells. Subsequently, aggregation component 164 may receive power related information from second management component 158 (e.g., RSRP measurements) which may act as or provide a trigger to initiate a power management procedure according to first management component 154.

Referring to FIGS. 5-8, the methods are shown and described as a series of acts for purposes of simplicity of explanation. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Figure 5:
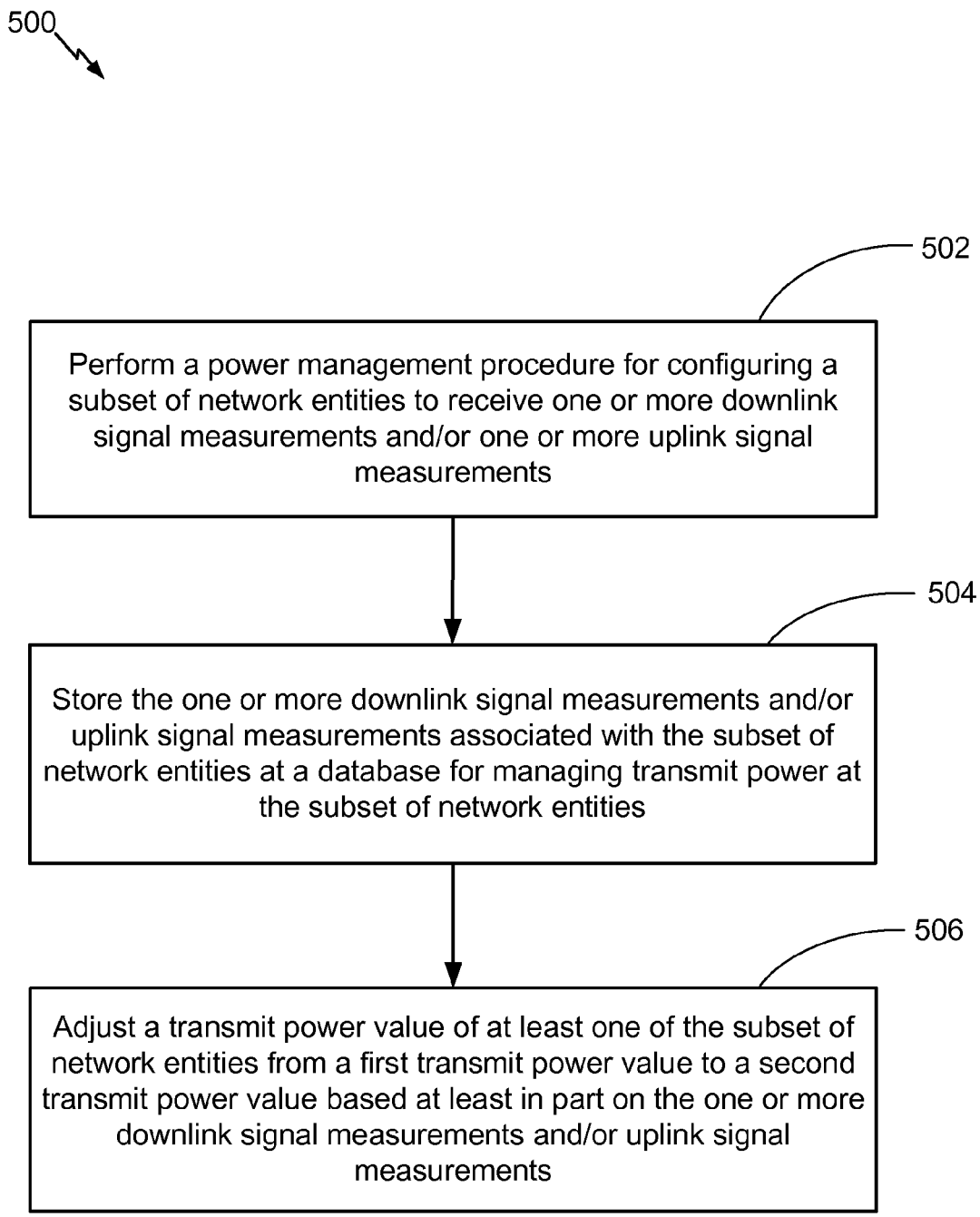
FIG. 5 is a flow diagram illustrating a method for communication, e.g., according to the power management component of FIG. 1.

Referring to FIG. 5, in an operational aspect, a network such as network controller 130 (FIG. 1) and/or a network entity such as network entity 110y (FIG. 1) may perform one aspect of a method 500 for coordinating power management according to the power management component 150 (FIG. 1).

In an aspect, at block 502, method 500 may perform a power management procedure for configuring a subset of network entities to receive one or more downlink signal measurements and/or uplink signal measurements. For example, as described herein, power management component 150 (FIG. 1) may execute one or both of first management component 154 and second management component 158 to perform a power management procedure for configuring a subset of network entities to receive one or more downlink signal measurements and/or uplink signal measurements.

Further, at block 504, method 500 may store the one or more downlink signal measurements and/or uplink signal measurements associated with the subset of network entities at a database for managing transmit power at the subset of network entities. For instance, as described herein, power management component 150 (FIG. 1) may execute one or both of first management component 154 and second management component 158 to store the one or more downlink signal measurements and/or uplink signal measurements associated with the subset of network entities at a database for managing transmit power at the subset of network entities.

Moreover, at block 506, method 500 may adjust a transmit power value of at least one of the subset of network entities from a first transmit power value to a second transmit power value based at least in part on the one or more power related measurements. For example, as described herein, power management component 150 (FIG. 1) may execute one or both of first management component 154 and second management component 158 to adjust a transmit power value of at least one of the subset of network entities from a first transmit power value to a second transmit power value based at least in part on the one or more downlink signal measurements and/or uplink signal measurements.

Figure 6:
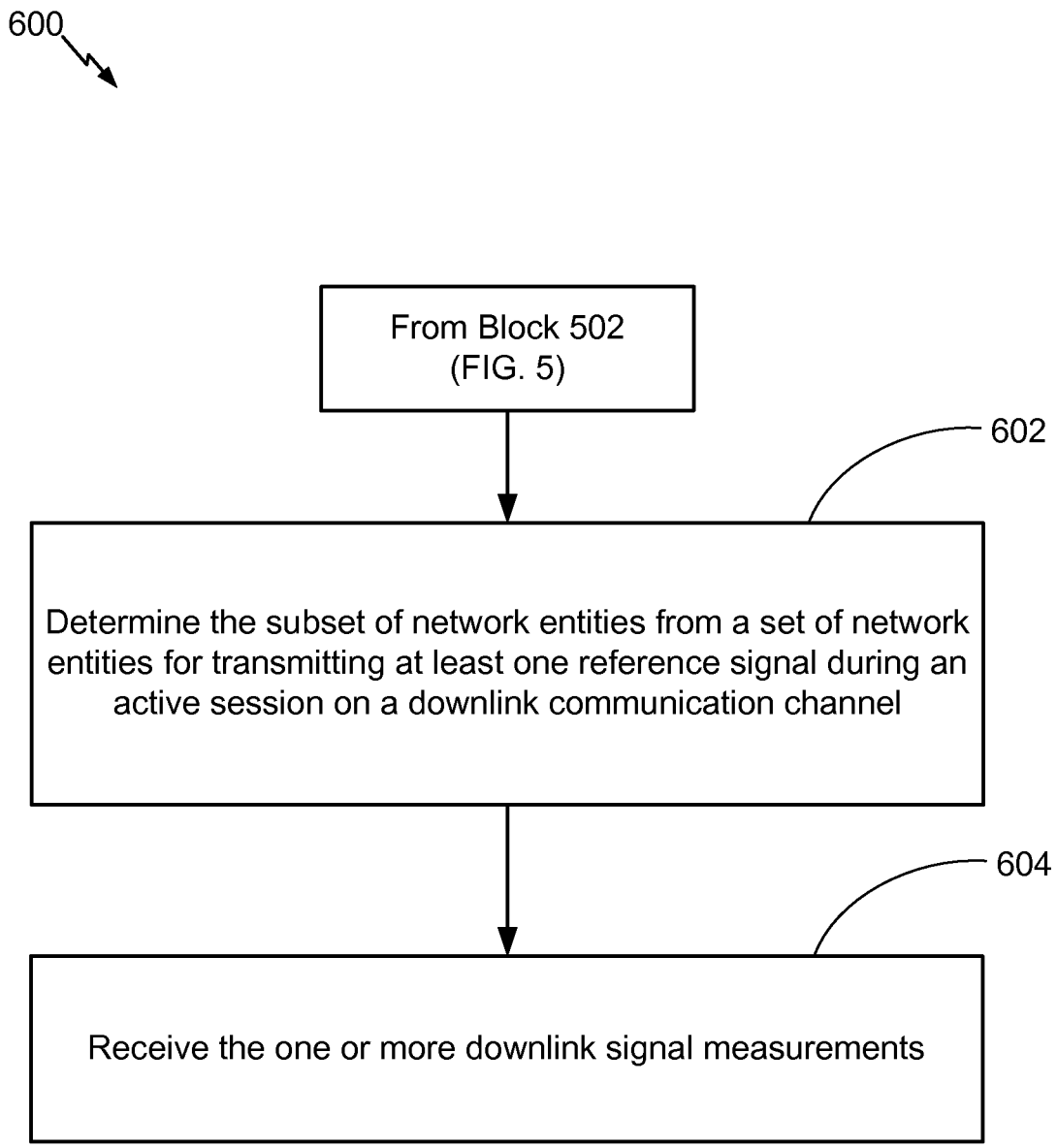
FIG. 6 is a flow diagram illustrating an aspect of a power management procedure, e.g., according to the power management component of FIG. 1.

Referring to FIG. 6, in an operational aspect, a network such as network controller 130 (FIG. 1) and/or a network entity such as network entity 110y (FIG. 1) may perform one aspect of a method 600 for power management according to the power management component 150 (FIG. 1), and in particular, the first management component 154 (FIG. 1). In some aspects, method 600 may proceed from or otherwise comprise block 502 (FIG. 5).

In an aspect, at block 602, method 600 may determine the subset of network entities from a set of one or more network entities for transmitting at least one reference signal during an active session on a downlink communication channel, wherein the reference signal indicates a downlink power value of each respective network entity of the subset of network entities. For example, as described herein, power management component 150 (FIG. 1) may execute first management component 154 to determine the subset of network entities from the set of network entities for transmitting at least one reference signal during an active session on a downlink communication channel. In some aspects, the reference signal may indicate a downlink power value of each respective network entity of the subset of network entities.

At block 604, method 600 includes receiving the one or more downlink signal measurements. For example, as described herein, power management component 150 (FIG. 1) may execute first management component 154 to receive the one or more downlink signal measurements.

Figure 7:
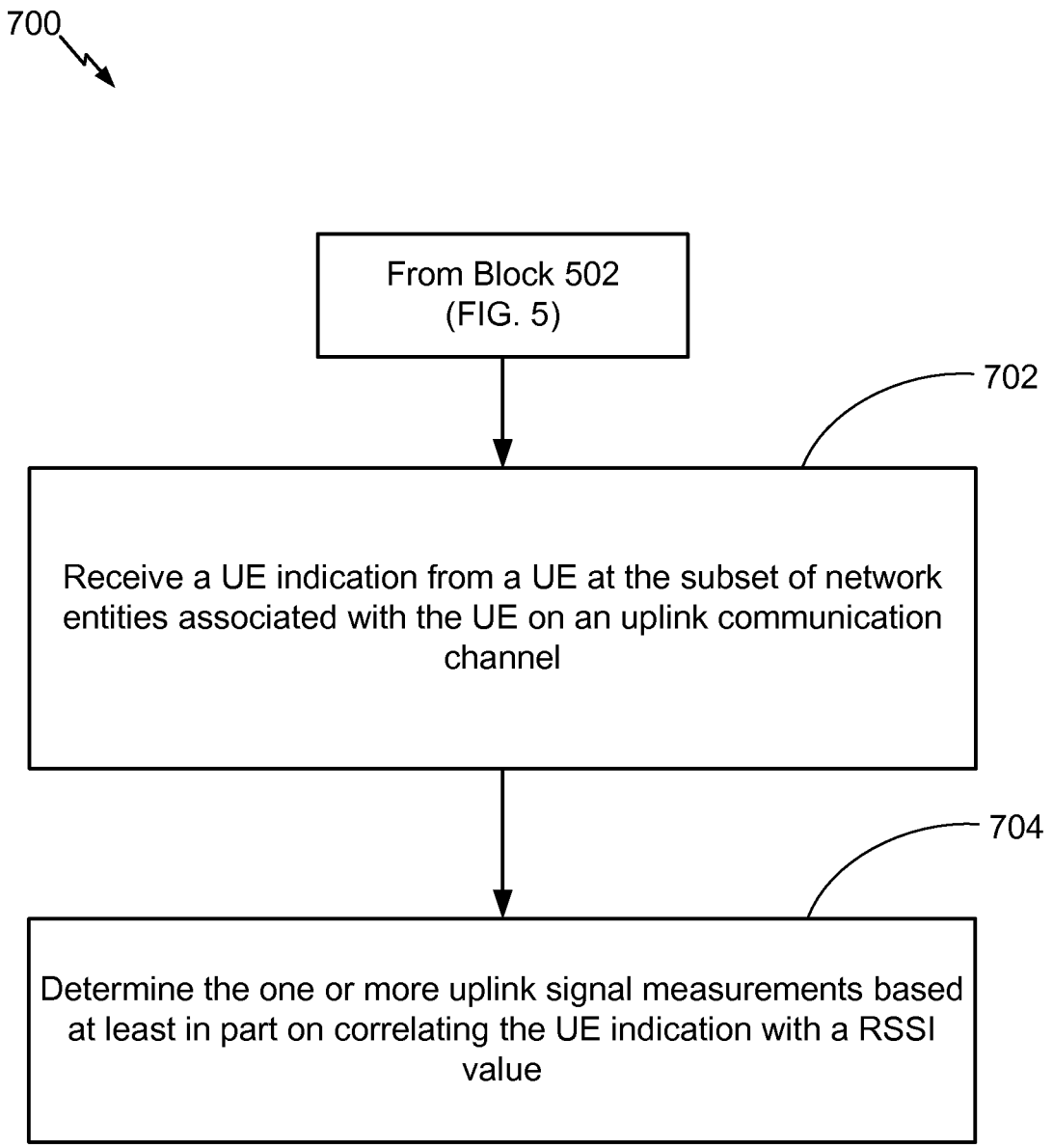
FIG. 7 is a flow diagram illustrating another aspect of a power management procedure, e.g., according to the power management component of FIG. 1.
Figure 8:
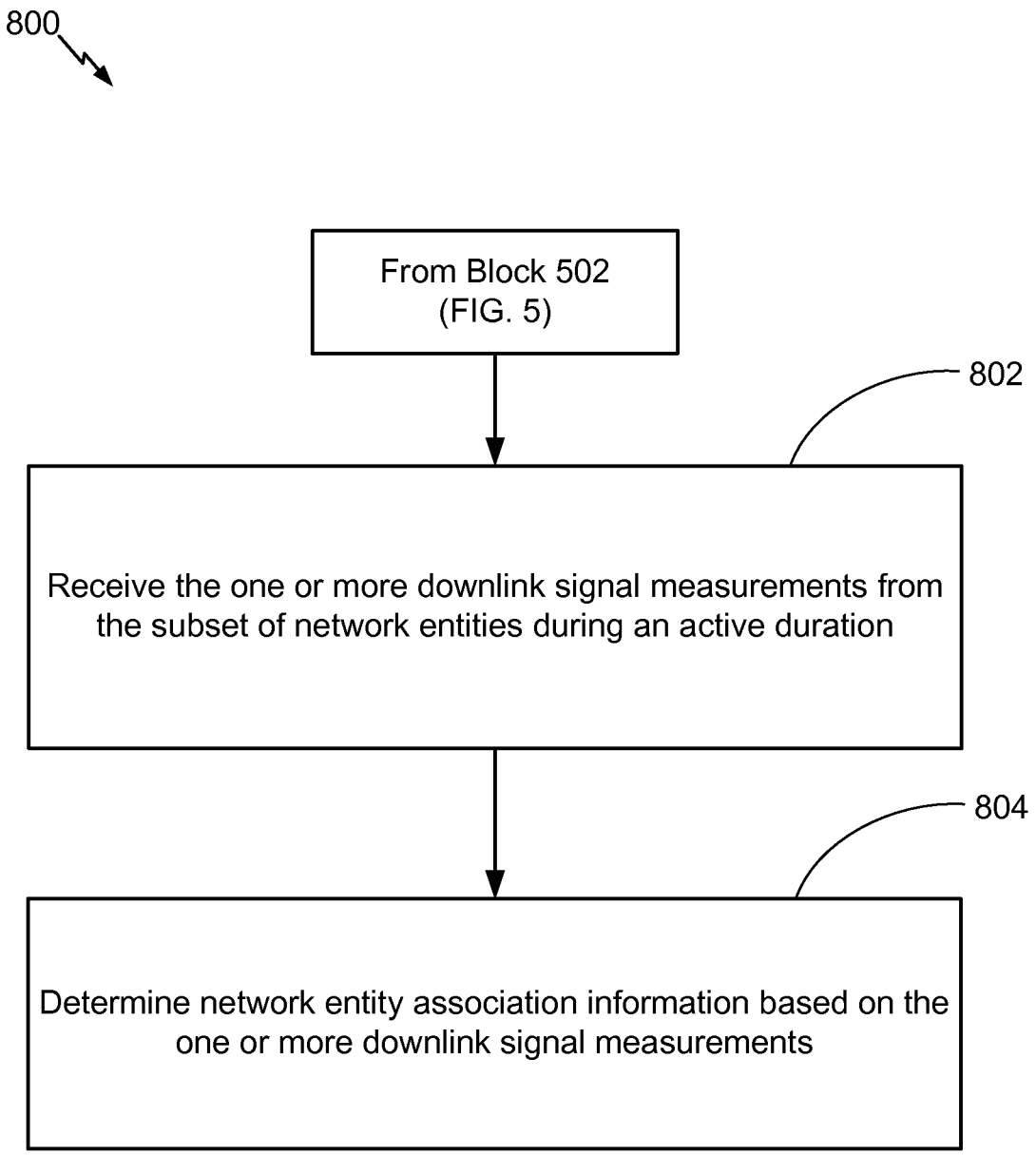
FIG. 8 is a flow diagram illustrating a further aspect of a power management procedure, e.g., according to the power management component of FIG. 1.

Referring to FIG. 7, in an operational aspect, a network such as network controller 130 (FIG. 1) and/or a network entity such as network entity 110y (FIG. 1) may perform one aspect of a method 700 for coordinating power management according to the power management component 150 (FIG. 1), and in particular, the first management component 154 (FIG. 1). In some aspects, method 700 may proceed from or otherwise comprise block 502 (FIG. 5).

In an aspect, at block 702, method 700 may receive a UE indication from a UE at the subset of network entities associated with the UE on an uplink communication channel. For example, as described herein, power management component 150 (FIG. 1) may execute first management component 154 to receive a UE indication from a UE at the subset of network entities associated with the UE on an uplink communication channel.

In a further aspect, at block 704, method 700 may determine the one or more uplink signal measurements based at least in part on correlating the UE indication with a RSSI value. For example, as described herein, power management component 150 (FIG. 1) may execute first management component 154 to determine the one or more uplink signal measurements based at least in part on correlating the UE indication with a RSSI value Referring to FIG. 8, in an operational aspect, a network such as network controller 130 (FIG. 1) and/or a network entity such as network entity 110y (FIG. 1) may perform one aspect of a method 800 for coordinating power management according to the power management component 150 (FIG. 1), and in particular, the second management component 158 (FIG. 1). In some aspects, method 800 may proceed or otherwise comprise block 502 (FIG. 5).

In an aspect, at block 802, method 800 may receive the one or more downlink signal measurements from the subset of network entities during an active duration. For example, as described herein, power management component 150 (FIG. 1) may execute second management component 158 to receive the one or more downlink signal measurements from the subset of network entities during an active duration. In some aspects, the subset of network entities comprise one or more network entities detected by one or more UEs forming one or both a technician route and a user route.

In an aspect, at block 804, method 800 may determine network entity association information based on the one or more downlink signal measurements. For example, as described herein, power management component 150 (FIG. 1) may execute second management component 158 to determine network entity association information based on the one or more downlink signal measurements. In some aspects, the network entity association information comprises statistical information relating to the one or more downlink signal measurements.

Figure 9:
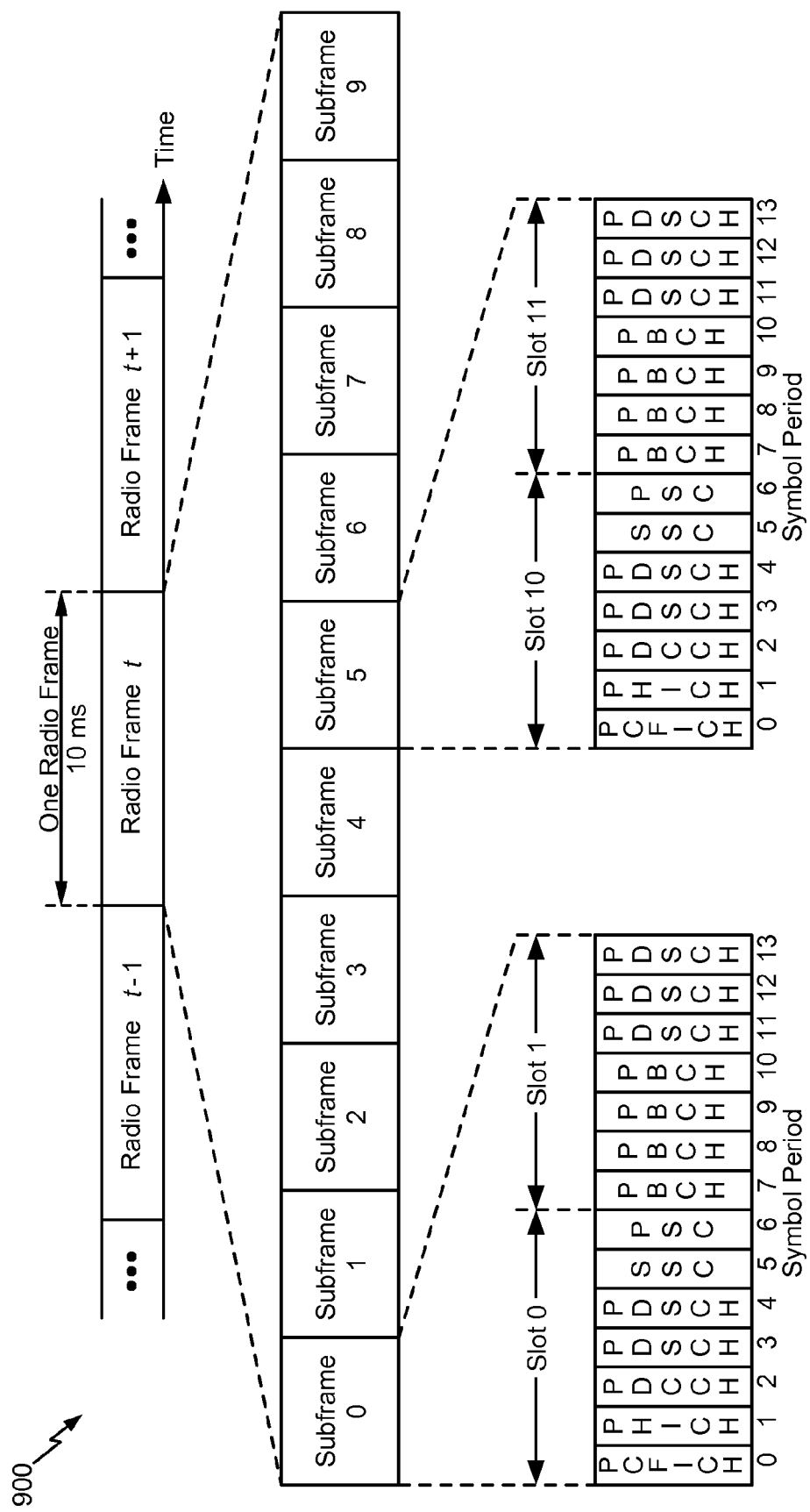
FIG. 9 is a block diagram conceptually illustrating an example of a downlink frame structure in a telecommunications system in accordance with an aspect of the present disclosure, e.g., according to FIG. 1.

FIG. 9 is a block diagram conceptually illustrating an example of a downlink frame structure 900 in a telecommunications system in accordance with an aspect of the present disclosure. For example, network controller 130 (FIG. 1), via small cell 110 (FIG. 1), one or both of which may include power management component 150 (FIG. 1), may communicate with one or more UEs 120 (FIG. 1) on the downlink according to the downlink frame structure 900. The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 9) or 14 symbol periods for an extended cyclic prefix (not shown). The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE for example, an eNodeB may send a primary synchronization signal (PSS) and a secondary synchronization signal (SSS) for each cell in the coverage area of the eNodeB. The primary synchronization signal (PSS) and secondary synchronization signal (SSS) may be sent in symbol periods 6 and 5, respectively, in each of sub-frames 0 and 5 of each radio frame with the normal cyclic prefix, as shown in FIG. 9. The synchronization signals may be used by UEs for cell detection and acquisition. The eNodeB may send system information in a Physical Broadcast Channel (PBCH) in symbol periods 0 to 3 of slot 1 of sub-frame 0.

The eNodeB may send information in a Physical Control Format Indicator Channel (PCFICH) in only a portion of the first symbol period of each sub-frame, although depicted in the entire first symbol period in FIG. 9. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 9, M=3. The eNodeB may send information in a Physical HARQ Indicator Channel (PHICH) and a Physical Downlink Control Channel (PDCCH) in the first M symbol periods of each sub-frame (M=3 in FIG. 9). The PHICH may carry information to support hybrid automatic retransmission (HARQ). The PDCCH may carry information on uplink and downlink resource allocation for UEs and power control information for uplink channels. Although not shown in the first symbol period in FIG. 9, it may be understood that the PDCCH and PHICH are also included in the first symbol period.

Similarly, the PHICH and PDCCH are also both in the second and third symbol periods, although not shown that way in FIG. 9. The eNodeB may send information in a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH around the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs in the coverage area. The eNodeB may send the PDCCH in a unicast manner to specific UEs in the coverage area. The eNodeB may also send the PDSCH in a unicast manner to specific UEs in the coverage area.

A number of resource elements may be available in each symbol period. Each resource element may cover one sub-carrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage areas of multiple eNodeBs. One of these eNodeBs may be selected to serve the UE. The serving eNodeB may be selected based on various criteria such as received power, path loss, signal-to-noise ratio (SNR), etc.

Figure 10:
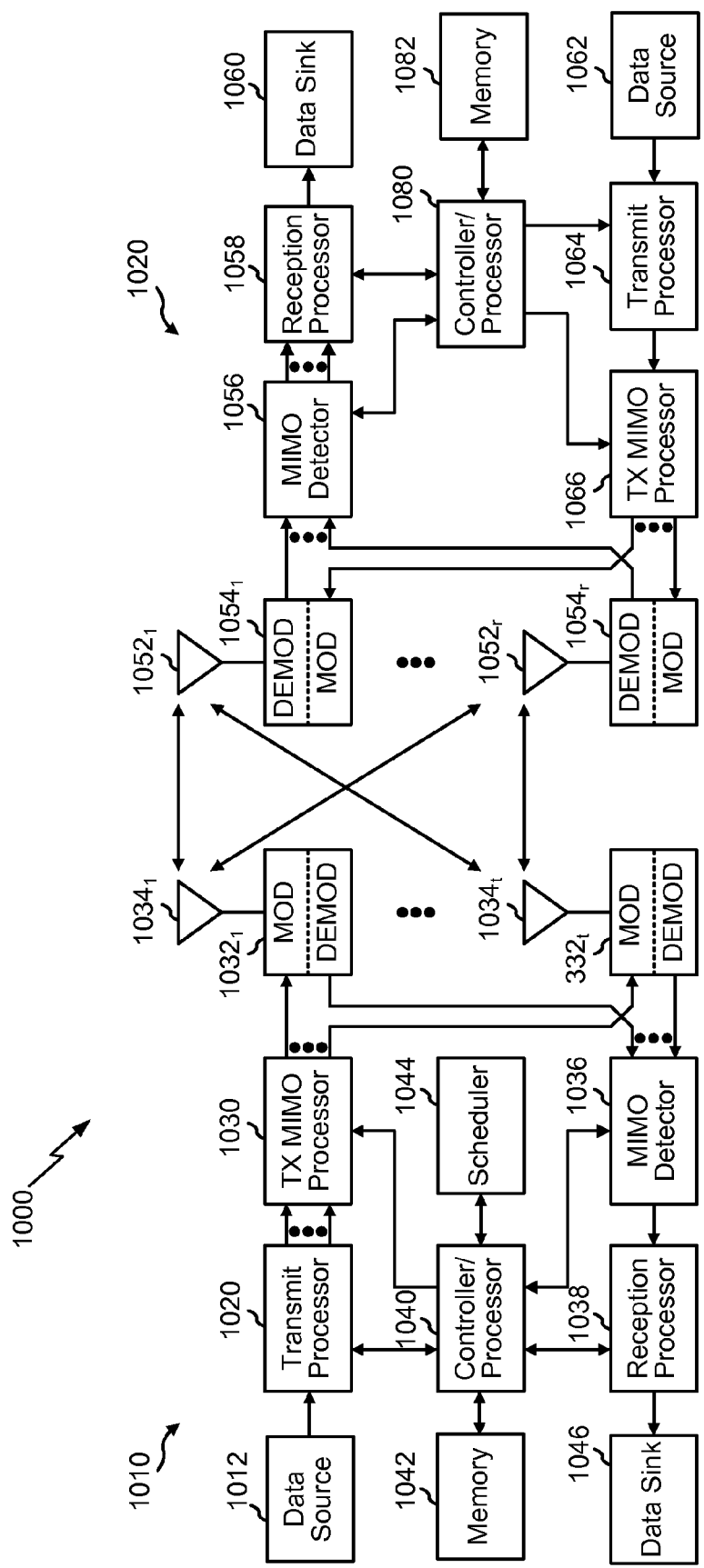
FIG. 10 is a block diagram conceptually illustrating an example eNodeB and an example UE configured in accordance with an aspect of the present disclosure, e.g., according to FIG. 1.

FIG. 10 is a block diagram conceptually illustrating an example eNodeB 1010 and an example UE 1020 configured in accordance with an aspect of the present disclosure. For example, the base station/eNodeB 1010 and the UE 1020, as shown in FIG. 10, may be one of the base stations/eNodeBs and one of the UEs in FIG. 1, including the network entity 110y including power management component 150. The base station 1010 may be equipped with antennas $1034_{1-t}$, and the UE 1020 may be equipped with antennas $1052_{1-r}$, wherein t and r are integers greater than or equal to one.

At the base station 1010, a base station transmit processor 1020 may receive data from a base station data source 1012 and control information from a base station controller/processor 1040. The control information may be carried on the PBCH, PCFICH, PHICH, PDCCH, etc. The data may be carried on the PDSCH, etc. The base station transmit processor 1020 may process (e.g., encode and symbol map) the data and control information to obtain data symbols and control symbols, respectively. The base station transmit processor 1020 may also generate reference symbols, e.g., for the PSS, SSS, and cell-specific reference signal (RS).

A base station transmit (TX) multiple-input multiple-output (MIMO) processor 1030 may perform spatial processing (e.g., precoding) on the data symbols, the control symbols, and/or the reference symbols, if applicable, and may provide output symbol streams to the base station modulators/demodulators (MODs/DEMODs) $1032_{1-t}$. Each base station modulator/demodulator 1032 may process a respective output symbol stream (e.g., for OFDM, etc.) to obtain an output sample stream. Each base station modulator/demodulator 1032 may further process (e.g., convert to analog, amplify, filter, and upconvert) the output sample stream to obtain a downlink signal. Downlink signals from modulators/demodulators $1032_{1-t}$ may be transmitted via the antennas $1034_{1-t}$, respectively.

At the UE 1020, the UE antennas $1052_{1-r}$, may receive the downlink signals from the base station 1010 and may provide received signals to the UE modulators/demodulators (MODs/DEMODs) $1054_{1-r}$, respectively. Each UE modulator/demodulator 1054 may condition (e.g., filter, amplify, downconvert, and digitize) a respective received signal to obtain input samples. Each UE modulator/demodulator 1054 may further process the input samples (e.g., for OFDM, etc.) to obtain received symbols. A UE MIMO detector 1056 may obtain received symbols from all the UE modulators/demodulators $1054_{1-r}$, and perform MIMO detection on the received symbols if applicable, and provide detected symbols. A UE reception processor 1058 may process (e.g., demodulate, deinterleave, and decode) the detected symbols, provide decoded data for the UE 1020 to a UE data sink 1060, and provide decoded control information to a UE controller/processor 1080.

On the uplink, at the UE 1020, a UE transmit processor 1064 may receive and process data (e.g., for the PUSCH) from a UE data source 1062 and control information (e.g., for the PUCCH) from the UE controller/processor 1080. The UE transmit processor 1064 may also generate reference symbols for a reference signal. The symbols from the UE transmit processor 1064 may be precoded by a UE TX MIMO processor 1066 if applicable, further processed by the UE modulator/demodulators $1054_{1-r}$ (e.g., for SC-FDM, etc.), and transmitted to the base station 1010. At the base station 1010, the uplink signals from the UE 1020 may be received by the base station antennas 1034, processed by the base station modulators/demodulators 1032, detected by a base station MIMO detector 1036 if applicable, and further processed by a base station reception processor 1038 to obtain decoded data and control information sent by the UE 1020. The base station reception processor 1038 may provide the decoded data to a base station data sink 1046 and the decoded control information to the base station controller/processor 1040.

The base station controller/processor 1040 and the UE controller/processor 1080 may direct the operation at the base station 1010 and the UE 1020, respectively. The base station controller/processor 1040 and/or other processors and modules at the base station 1010 may perform or direct, e.g., the execution of various processes for the techniques described herein. The base station memory 1042 and the UE memory 1082 may store data and program codes for the base station 1010 and the UE 1020, respectively. A scheduler 1044 may schedule UEs (e.g., UEs 120) for data transmission on the downlink and/or uplink.

In one configuration, the base station 1010 may include means for generating a compact Downlink Control Information (DCI) for at least one of uplink (UL) or downlink (DL) transmissions, wherein the compact DCI comprises a reduced number of bits when compared to certain standard DCI formats; and means for transmitting the DCI. In one aspect, the aforementioned means may be the base station controller/processor 1040, the base station memory 1042, the base station transmit processor 1020, the base station modulators/demodulators 1032, and the base station antennas 1034 configured to perform the functions recited by the aforementioned means. In another aspect, the aforementioned means may be a module or any apparatus configured to perform the functions recited by the aforementioned means.

In one configuration, the UE 1020 may include means for receiving compact Downlink Control Information (DCI) for at least one of uplink (UL) or downlink (DL) transmissions, wherein the DCI comprises a reduced number of bits of a standard DCI format; and means for processing the DCI. In one aspect, the aforementioned means may be the UE controller/processor 1080, the UE memory 1082, the UE reception processor 1058, the UE MIMO detector 1056, the UE modulators/demodulators 1054, and the UE antennas 1052 configured to perform the functions recited by the aforementioned means. In another aspect, the aforementioned means may be a module or any apparatus configured to perform the functions recited by the aforementioned means.

Figure 11:
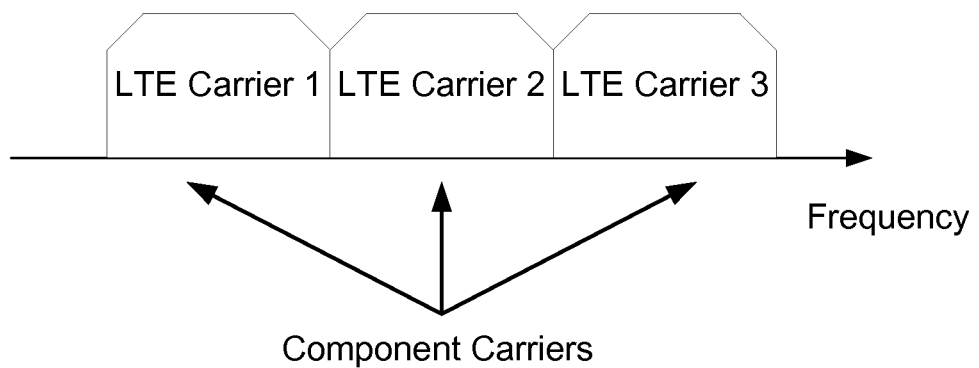
FIG. 11 illustrates a continuous carrier aggregation type in accordance with an aspect of the present disclosure, e.g., according to FIG. 1.
Figure 12:
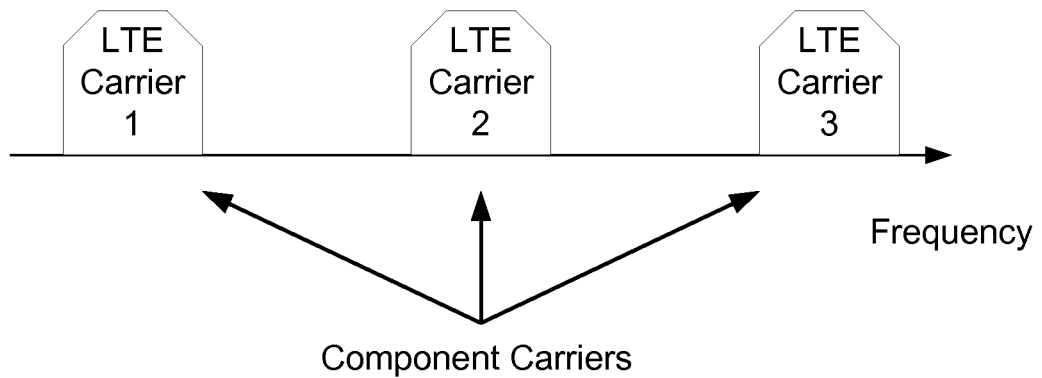
FIG. 12 illustrates a non-continuous carrier aggregation type in accordance with an aspect of the present disclosure, e.g., according to FIG. 1.

Referring to FIGS. 11 and 12, UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA, which are illustrated in FIGS. 11 and 12, respectively. Continuous CA occurs when multiple available component carriers are adjacent to each other (as illustrated in FIG. 11). On the other hand, non-continuous CA occurs when multiple non-adjacent available component carriers are separated along the frequency band (as illustrated in FIG. 12). It should be understood that any one or more network entities (e.g., eNodeBs), including small cells 110, illustrated in FIG. 1 may communicate or facilitate communication according to the aspects set forth with regard to FIGS. 11 and 12.

Both non-continuous and continuous CA may aggregate multiple component carriers to serve a single unit of LTE-Advanced UEs. In various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support may be referred to as "associated secondary carriers." For example, the UE may aggregate control functions such as those provided by the optional dedicated channel (DCH), the nonscheduled grants, a physical uplink control channel (PUCCH), and/or a physical downlink control channel (PDCCH).

LTE-A standardization may require carriers to be backward-compatible, to enable a smooth transition to new releases. However, backward-compatibility may require the carriers to continuously transmit common reference signals (CRS), also may be referred to as (cell-specific reference signals) in every subframe across the bandwidth. Most cell site energy consumption may be caused by the power amplifier since the cell remains on even when only limited control signalling is being transmitted, causing the amplifier to continuously consume energy. CRS were introduced in release 8 of LTE standard and may be referred to as LTE's most basic downlink reference signal. For example, CRS may be transmitted in every resource block in the frequency domain and in every downlink subframe.

CRS in a cell can be for one, two, or four corresponding antenna ports. CRS may be used by remote terminals to estimate channels for coherent demodulation. A new carrier type may allow temporarily switching off of cells by removing transmission of CRS in four out of five subframes. This reduces power consumed by the power amplifier. It also may reduce the overhead and interference from CRS since the CRS won't be continuously transmitted in every subframe across the bandwidth. In addition, the new carrier type may allow the downlink control channels to be operated using UE-specific demodulation reference symbols. The new carrier type might be operated as a kind of extension carrier along with another LTE/LTE-A carrier or alternatively as standalone non-backward compatible carrier.

Figure 13:
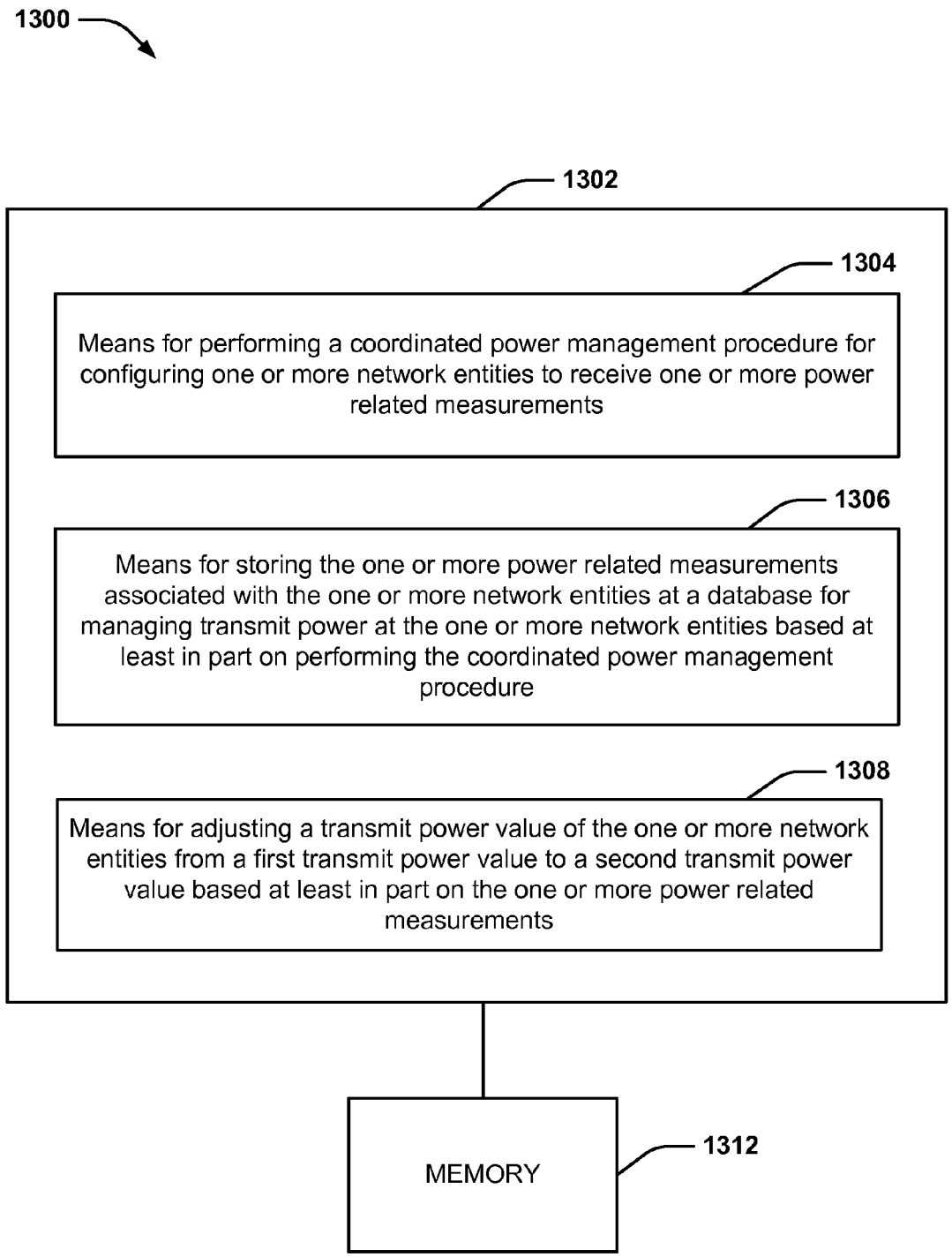
FIG. 13 illustrates an aspect of a system for detecting collisions in accordance with the present disclosure, e.g., according to FIG. 1.

Referring to FIG. 13, an example system 1300 for power management may operate according to the aspects of the power management component 150 (FIGS. 1-3) and the corresponding methods (FIGS. 5-8) are illustrated. For example, but not limited hereto, system 1300 may reside at least partially within a base station, network entity, such as a small cell, mobile device, etc. It is to be appreciated that system 1300 may be represented as including functional blocks, which may be functional blocks that represent functions implemented by a processor including power management component 150 (FIGS. 1-3), software, or combination thereof (e.g., firmware). System 1300 may include a logical grouping 1302 of means that can act in conjunction. For instance, logical grouping 1302 may include means 1304 for performing a power management procedure for configuring one or more network entities to receive one or more power related measurements.

Further, logical grouping 1302 may include means 1306 for storing the one or more power related measurements associated with the one or more network entities at a database for managing transmit power at the one or more network entities based at least in part on performing the power management procedure. Moreover, logical grouping 1302 may include means 1308 for adjusting a transmit power value of the one or more network entities from a first transmit power value to a second transmit power value based at least in part on the one or more power related measurements. Thus, as described, the small cell or network entity may select a parameter for improved conflict/collision detection and resolution. Additionally, system 1300 may include a memory 1312 that retains instructions for executing functions associated with the means 1304, 1306 and 1308. While shown as being external to memory 1312, it may be understood that one or more of the means 1304, 1306 and 1308 may exist and/or reside within memory 1312. Additionally, each of the means 1304, 1306 and 1308 may include one or more electrical components.

Figure 14:
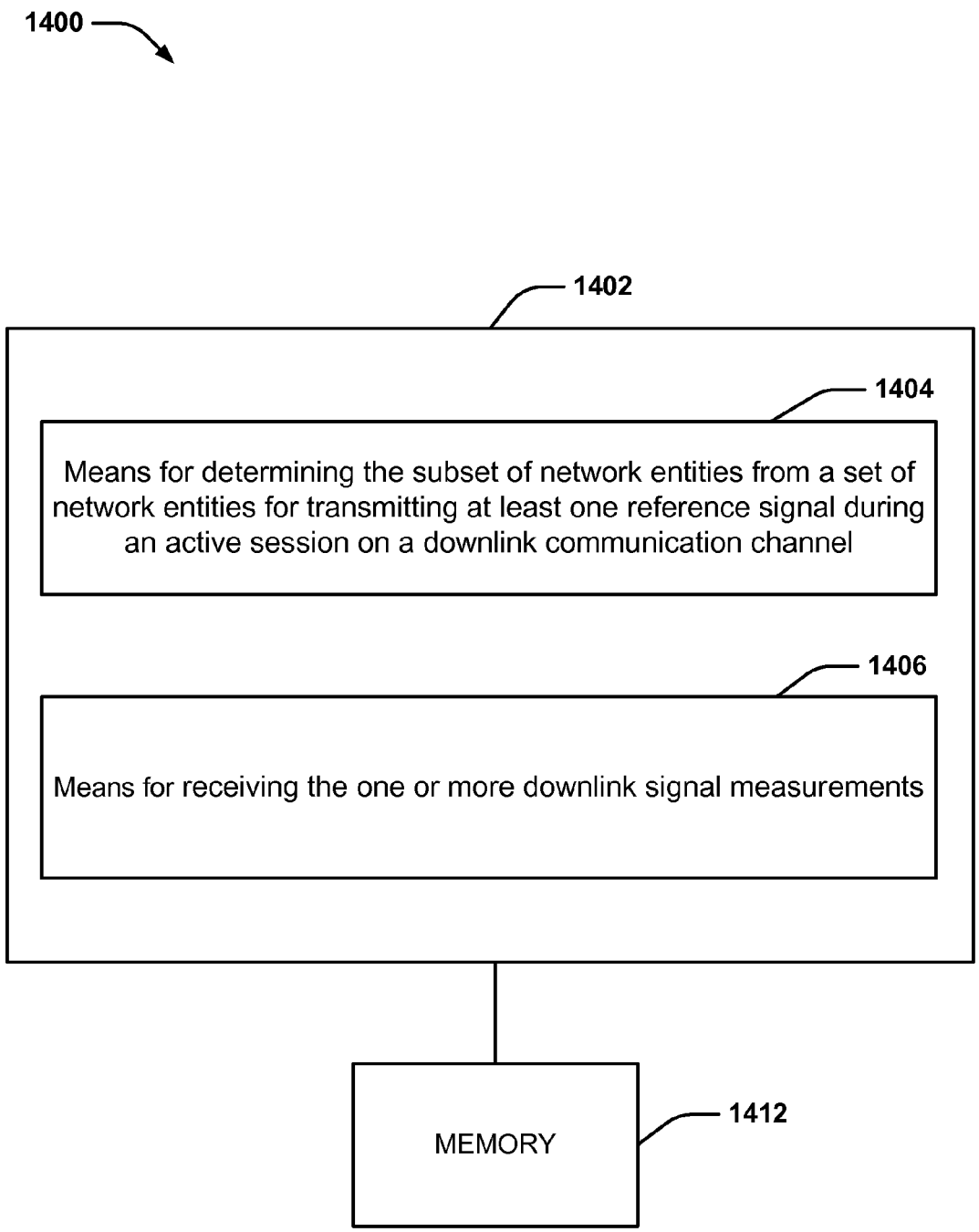
FIG. 14 illustrates another aspect of a system for detecting collisions in accordance with the present disclosure, e.g., according to FIG. 1.

Referring to FIG. 14, an example system 1400 for power management may operate according to the aspects of the power management component 150 (FIGS. 1-3) and the corresponding methods (FIGS. 5-8) are illustrated. For example, but not limited hereto, system 1400 may reside at least partially within a base station, network entity, such as a small cell, mobile device, etc. It is to be appreciated that system 1400 may be represented as including functional blocks, which may be functional blocks that represent functions implemented by a processor including power management component 150 (FIGS. 1-3), software, or combination thereof (e.g., firmware). System 1400 may include a logical grouping 1402 of means that can act in conjunction.

For instance, logical grouping 1402 may include means 1404 for determining the subset of network entities from a set of network entities for transmitting at least one reference signal during an active session on a downlink communication channel. Further, logical grouping 1402 may include means 1406 for receiving the one or more downlink signal measurements. Thus, as described, the small cell or network entity may select a parameter for improved conflict/collision detection and resolution. Additionally, system 1400 may include a memory 1412 that retains instructions for executing functions associated with the means 1404 and 1406. While shown as being external to memory 1412, it may be understood that one or more of the means 1404 and 1406 may exist and/or reside within memory 1412. Additionally, each of the means 1404 and 1406 may include one or more electrical components.

Figure 15:
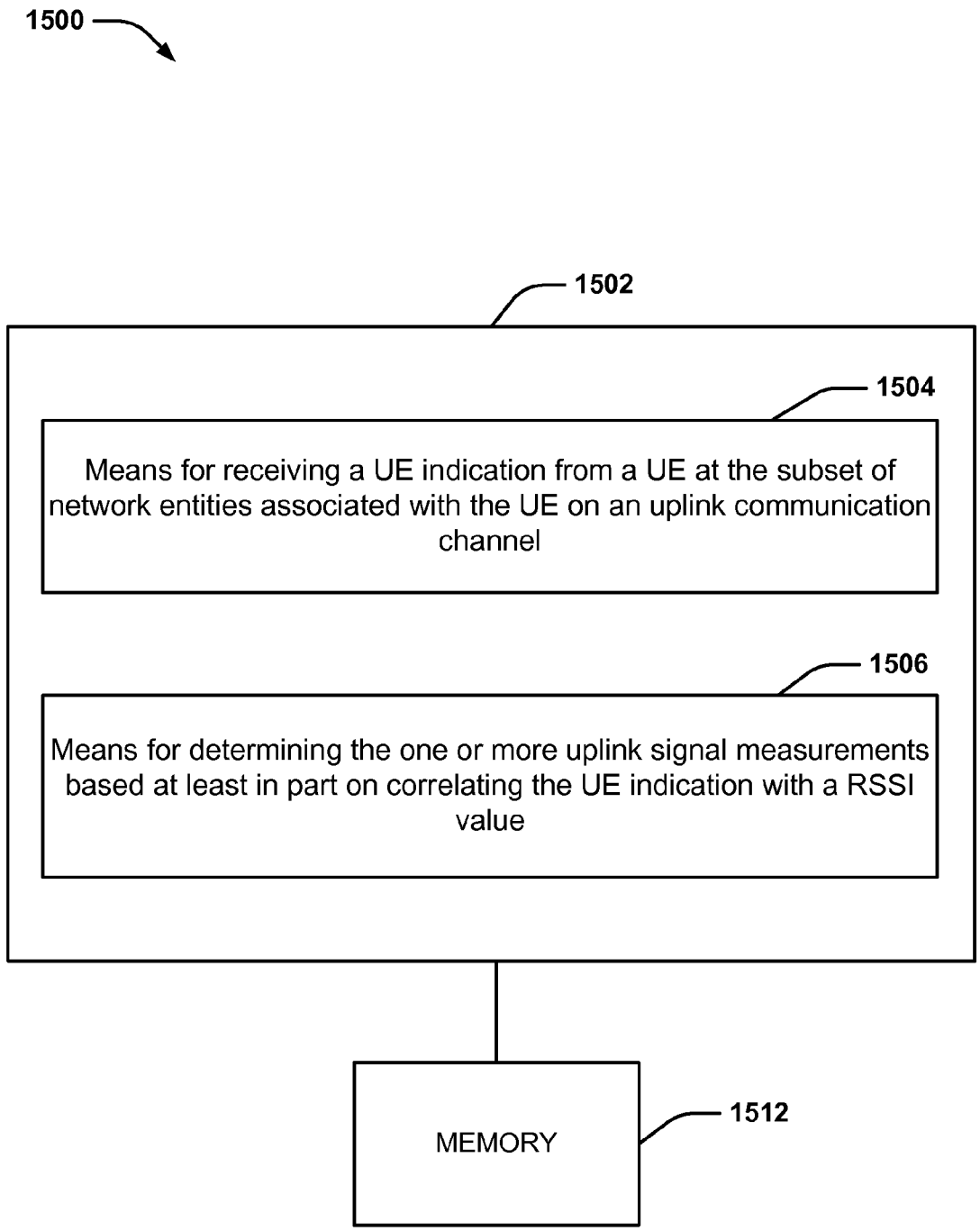
FIG. 15 illustrates a further aspect of a system for detecting collisions in accordance with the present disclosure, e.g., according to FIG. 1.

Referring to FIG. 15, an example system 1500 for power management may operate according to the aspects of the power management component 150 (FIGS. 1-3) and the corresponding methods (FIGS. 5-8) are illustrated. For example, but not limited hereto, system 1500 may reside at least partially within a base station, network entity, such as a small cell, mobile device, etc. It is to be appreciated that system 1500 may be represented as including functional blocks, which may be functional blocks that represent functions implemented by a processor including power management component 150 (FIGS. 1-3), software, or combination thereof (e.g., firmware). System 1500 may include a logical grouping 1302 of means that can act in conjunction.

For instance, logical grouping 1502 may include means 1504 for receiving a UE indication from a UE at the subset of network entities associated with the UE on an uplink communication channel. Further, logical grouping 1502 may include means 1506 for determining the one or more uplink signal measurements based at least in part on correlating the UE indication with a RSSI value. Thus, as described, the small cell or network entity may select a parameter for improved conflict/collision detection and resolution. Additionally, system 1500 may include a memory 1512 that retains instructions for executing functions associated with the means 1504 and 1506. While shown as being external to memory 1512, it may be understood that one or more of the means 1504 and 1506 may exist and/or reside within memory 1512. Additionally, each of the means 1504 and 1506 may include one or more electrical components.

Figure 16:
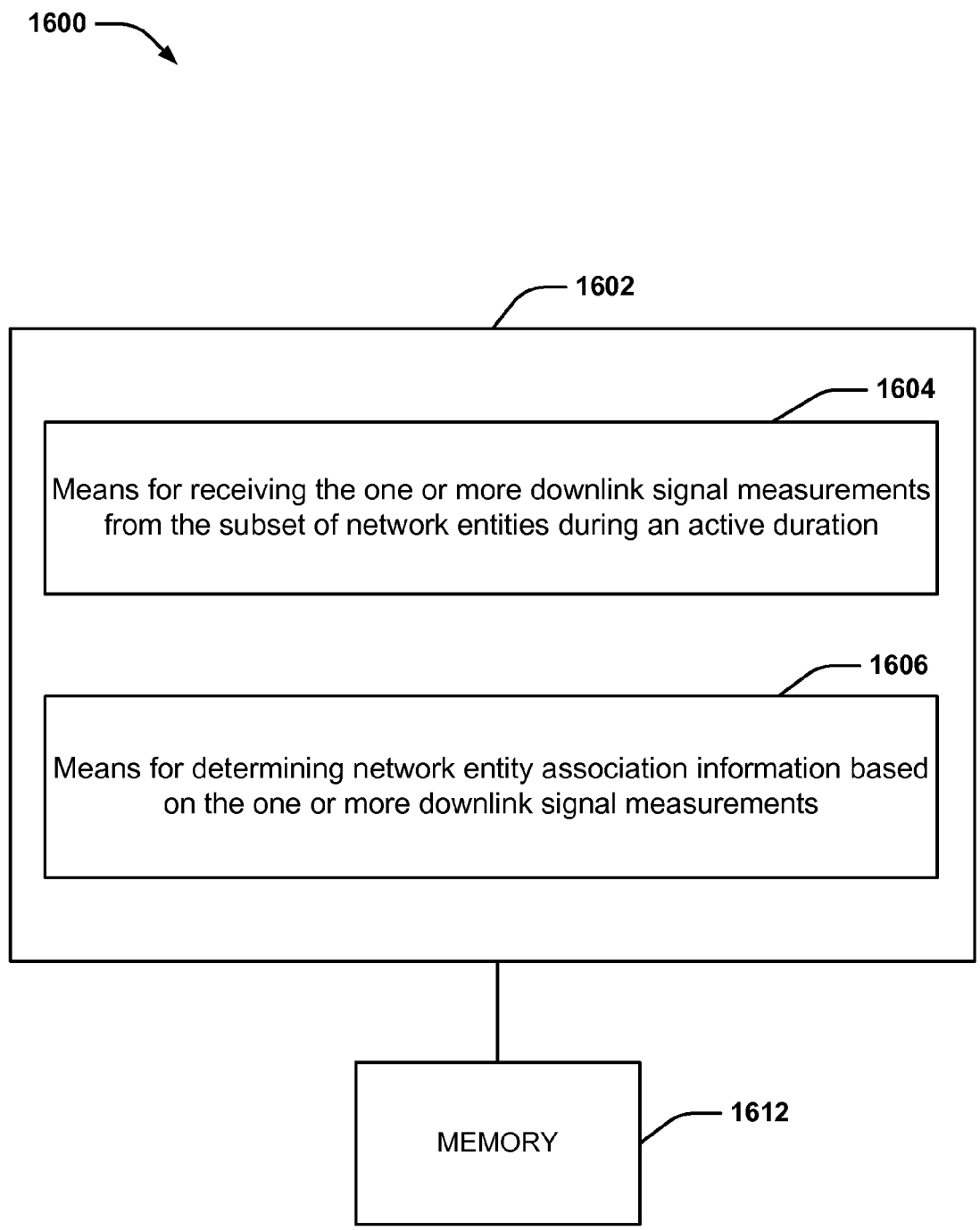
FIG. 16 illustrates another of a system for detecting collisions in accordance with the present disclosure, e.g., according to FIG. 1.

Referring to FIG. 16, an example system 1600 for power management may operate according to the aspects of the power management component 150 (FIGS. 1-3) and the corresponding methods (FIGS. 5-8) are illustrated. For example, but not limited hereto, system 1600 may reside at least partially within a base station, network entity, such as a small cell, mobile device, etc. It is to be appreciated that system 1600 may be represented as including functional blocks, which may be functional blocks that represent functions implemented by a processor including power management component 150 (FIGS. 1-3), software, or combination thereof (e.g., firmware). System 1600 may include a logical grouping 1302 of means that can act in conjunction.

For instance, logical grouping 1602 may include means 1604 for receiving the one or more downlink signal measurements from the subset of network entities during an active duration. Further, logical grouping 1602 may include means 1606 for determining network entity association information based on the one or more downlink signal measurements. Thus, as described, the small cell or network entity may select a parameter for improved conflict/collision detection and resolution. Additionally, system 1600 may include a memory 1612 that retains instructions for executing functions associated with the means 1604 and 1606. While shown as being external to memory 1612, it may be understood that one or more of the means 1604 and 1606 may exist and/or reside within memory 1612. Additionally, each of the means 1604 and 1606 may include one or more electrical components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more example designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of communication, comprising:
   performing at least one power management procedure for configuring at least one of a subset of network entities to receive one or more downlink signal measurements of the subset of network entities, wherein performing the at least one power management procedure includes:
   determining the subset of network entities from a set of network entities based on a power value of a reference signal transmitted by the subset of network entities during an inactive session;
   scheduling transmission of at least one reference signal for each respective network entity of the subset of network entities during an active session on a downlink communication channel to avoid interference with neighboring network entities; and
   receiving the one or more downlink signal measurements of the at least one reference signal transmitted by each respective network entity of the subset of network entities;
   storing the one or more downlink signal measurements associated with the subset of network entities at a database for managing transmit power at the subset of network entities; and
   adjusting a transmit power value of at least one of the subset of network entities from a first transmit power value to a second transmit power value based at least in part on the one or more downlink signal measurements.

2. The method of claim 1, further comprising determining a technician route based at least in part on determining the subset of network entities, wherein receiving the one or more downlink signal measurements comprises receiving, from one or more measurement devices associated with the technician route, the one or more downlink signal measurements of the subset of network entities.

3. The method of claim 2, wherein receiving the one or more downlink signal measurements comprises receiving, from the one or more measurement devices associated with the technician route, a measurement value from at least a portion of the subset of network entities experiencing higher traffic than at least another portion of the subset of network entities.

4. The method of claim 1, wherein the transmission of the at least one reference signal by each of the subset of network entities during the active session occurs at a first reference signal transmit power value, which is higher than a second reference signal transmit power value during the inactive session.

5. The method of claim 1, wherein scheduling the transmission of the at least one reference signal for each respective network entity of the subset of network entities during the active session is based on one or both of a random assignment procedure and a self-organizing procedure.

6. The method of claim 5, wherein determining the subset of network entities from the set of network entities comprises determining a first network entity from the set of network entities for transmission of the at least one reference signal at a first time slot and a second network entity from the set of network entities for transmission of the at least one reference signal at a second time slot, wherein determining of the first network entity and the second network entity is based at least in part on one or both of the random assignment procedure and the self-organizing procedure.

7. The method of claim 5, wherein determining the subset of network entities from the set of network entities comprises determining a first network entity from the set of network entities for transmission of the at least one reference signal at a first frequency value and a second network entity from the set of network entities for transmission of the at least one reference signal at a second frequency value, wherein determining of the first network entity and the second network entity is based at least in part on one or both of the random assignment procedure and the self-organizing procedure.

8. The method of claim 1, wherein the one or more downlink signal measurements comprise one or more signal-to-interference-plus-noise-ratio (SINR) values, one or more of reference signal received quality (RSRQ) values and one or more indications related to SINR or RSRQ.

9. The method of claim 1, wherein performing the power management procedure comprises:
receiving the one or more downlink signal measurements of the subset of network entities during an active duration, wherein the subset of network entities comprise one or more network entities detected by one or more UEs forming one or both a technician route and a user route; and
determining network entity association information based on the one or more downlink signal measurements, wherein the network entity association information comprises statistical information relating to the one or more downlink signal measurements.

10. The method of claim 9, wherein the one or more downlink signal measurements are received from the one or more UEs forming the technician route during a first measurement time duration or the one or more UEs forming the user route during a second measurement time duration, wherein the second measurement time duration is longer in duration than the first measurement time duration.

11. The method of claim 9, wherein the network entity association information comprises one or both of statistical information detected in a time domain for the subset of network entities and statistical information detected in a spatial domain for the subset of the network entities.

12. The method of claim 9, wherein the one or more downlink signal measurements comprise one or more reference signal receive power (RSRP) values.

13. A method of communication, comprising:
performing a power management procedure for configuring at least one network entity of a subset of network entities to receive one or more uplink signal measurements associated with the subset of network entities, wherein performing the power management procedure includes:
receiving, by the at least one network entity from the subset of network entities, a UE indication, wherein the UE indication is received by the subset of network entities from one or more UEs and is associated with the one or more UEs on an uplink communication channel; and
determining the one or more uplink signal measurements based at least in part on correlating the UE indication with a received signal strength indicator (RSSI) value;
storing the one or more uplink signal measurements associated with the subset of network entities at a database for managing transmit power at the subset of network entities; and
adjusting a transmit power value of at least one of the subset of network entities from a first transmit power value to a second transmit power value based at least in part on the one or more uplink signal measurements.

14. The method of claim 13, wherein the UE indication comprises a sounding reference signal (SRS) and a demodulation reference signal (DM-RS).

15. An apparatus for communication, comprising:
a memory storing executable instructions; and
a processor in communication with the memory, wherein the processor is configured to execute the instructions to:
perform at least one power management procedure for configuring at least one of a subset of network entities to receive one or more downlink signal measurements of the subset of network entities, wherein the instructions to perform the at least one power management procedure include instructions to:
determine the subset of network entities from a set of network entities based on a power value of a reference signal transmitted by the subset of network entities during an inactive session;
schedule transmission of the at least one reference signal for each respective network entity of the subset of network entities during an active session on a downlink communication channel to avoid interference with neighboring network entities; and
receive the one or more downlink signal measurements of the at least one reference signal transmitted by each respective network entity of the subset of network entities;
store the one or more downlink signal measurements associated with the subset of network entities at a database for managing transmit power at the subset of network entities; and
adjust a transmit power value of at least one of the subset of network entities from a first transmit power value to a second transmit power value based at least in part on the one or more downlink signal measurements.

16. The apparatus of claim 15, wherein the processor is further configured to execute the instructions to determine a technician route based at least in part on determining the subset of network entities, wherein to receive the one or more downlink signal measurements, the processor is further configured to execute the instructions to receive, from one or more measurement devices associated with the technician route, the one or more downlink signal measurements of the subset of network entities.

17. The apparatus of claim 16, wherein to receive the one or more downlink signal measurements, the processor is further configured to execute the instructions to receive, from the one or more measurement devices associated with the technician route, a measurement value from at least a portion of the subset of network entities experiencing higher traffic than at least another portion of the subset of network entities.

18. The apparatus of claim 15, wherein the transmission of the at least one reference signal by each of the subset of network entities during the active session occurs at a first reference signal transmit power value, which is higher than a second reference signal power value during the inactive session.

19. The apparatus of claim 15, wherein the processor is further configured to execute the instructions to schedule the transmission of the at least one reference signal for each respective network entity of the subset of network entities during the active session based on one or both of a random assignment procedure and a self-organizing procedure.

20. The apparatus of claim 19, wherein to determine the subset of network entities from the set of network entities, the processor is further configured to execute the instructions to determine a first network entity from the set of network entities for transmission of the at least one reference signal at a first time slot and a second network entity from the set of network entities for transmission of the at least one reference signal at a second time slot, wherein determining of the first network entity and the second network entity is based at least in part on one or both of the random assignment procedure and the self-organizing procedure.

21. The apparatus of claim 19, wherein to determine the subset of network entities from the set of network entities, the processor is further configured to execute the instructions to determine a first network entity from the set of network entities for transmission of the at least one reference signal at a first frequency value and a second network entity from the set of network entities for transmission of the at least one reference signal at a second frequency value, wherein determining of the first network entity and the second network entity is based at least in part on one or both of the random assignment procedure and the self-organizing procedure.

22. The apparatus of claim 15, wherein the one or more downlink signal measurements comprise one or more signal-to-interference-plus-noise-ratio (SINR) values, one or more of reference signal received quality (RSRQ) values and one or more indications related to SINR or RSRQ.

23. The apparatus of claim 15, wherein to perform the power management procedure, the processor is further configured to execute the instructions to:
receive the one or more downlink signal measurements of the subset of network entities during an active duration, wherein the subset of network entities comprise one or more network entities detected by one or more UEs forming one or both a technician route and a user route; and
determine network entity association information based on the one or more downlink signal measurements, wherein the network entity association information comprises statistical information relating to the one or more downlink signal measurements.

24. The apparatus of claim 23, wherein the one or more downlink signal measurements are received from the one or more UEs forming the technician route during a first measurement time duration or the one or more UEs forming the user route during a second measurement time duration, wherein the second measurement time duration is longer in duration than the first measurement time duration.

25. The apparatus of claim 23, wherein the network entity association information comprises one or both of statistical information detected in a time domain for the subset of network entities and statistical information detected in a spatial domain for the subset of the network entities.

26. The apparatus of claim 23, wherein the one or more downlink signal measurements comprise one or more reference signal receive power (RSRP) values.

27. An apparatus for communication, comprising:
a memory storing executable instructions; and
a processor in communication with the memory, wherein the processor is configured to execute the instructions to:
perform a power management procedure for configuring at least one network entity of a subset of network entities to receive one or more uplink signal measurements associated with the subset of network entities, wherein the instructions to perform the power management procedure include instructions to:
receive, by the at least one network entity from the subset of network entities, a UE indication, wherein the UE indication is received by the subset of network entities from one or more UEs and is associated with the one or more UEs on an uplink communication channel; and
determine the one or more uplink signal measurements based at least in part on correlating the UE indication with a received signal strength indicator (RSSI) value;
store the one or more uplink signal measurements associated with the subset of network entities at a database for managing transmit power at the subset of network entities; and
adjust a transmit power value of at least one of the subset of network entities from a first transmit power value to a second transmit power value based at least in part on the one or more uplink signal measurements.

28. The apparatus of claim 27, wherein the UE indication comprises a sounding reference signal (SRS) and a demodulation reference signal (DM-RS).

* * * * *